United States Patent [19]

Iwahara et al.

[11] Patent Number: 5,085,495
[45] Date of Patent: Feb. 4, 1992

[54] MULTI-SCREEN PROJECTOR

[75] Inventors: Yoshiaki Iwahara; Masanori Ogino; Masutomi Ohta, all of Yokohama; Shoji Kuroda, Odawara; Yuzo Tamura; Yukihiro Kobayashi, both of Yokohama, all of Japan

[73] Assignee: Hitachi, Ltd., Tokyo, Japan

[21] Appl. No.: 661,112

[22] Filed: Feb. 26, 1991

[30] Foreign Application Priority Data

Feb. 28, 1990 [JP] Japan ................................. 2-45381
Dec. 26, 1990 [JP] Japan ................................ 2-417591

[51] Int. Cl.$^5$ ............................................ G03B 21/60
[52] U.S. Cl. ..................................... 359/455; 353/94; 358/237
[58] Field of Search .................. 350/123, 128, 125; 358/237, 60; 353/94, 38

[56] References Cited

U.S. PATENT DOCUMENTS 4,919,518  4/1990  Ogino et al. ...................... 350/128
5,011,277  4/1991  Ogino et al. ........................ 353/94

Primary Examiner—Richard A. Wintercorn
Attorney, Agent, or Firm—Antonelli, Terry, Stout & Kraus

[57] ABSTRACT

A support member for supporting a plurality of vertically-arranged Fresnel sheets is fixedly mounted on a lower end portion of a reinforcing sheet. A hanging mechanism hangs the reinforcement sheet and the Fresnel sheets vertically adjustably. An elongated screen is constituted by a plurality of vertically-arranged unit screens, and the overall screen is constituted by a plurality of elongated screens arranged horizontally. A mechanism for preventing the relative displacement of the opposed edges of the elongated screens from each other in a direction perpendicular to the plane of the elongated screen is provided at an effective projection light-absent region where the light projected from projectors onto the screen is not hindered. A mechanism for limiting the absolute displacement of the elongated screens in a direction perpendicular to the plane of the elongated screen is provided at the right and left edges of the elongated screens and is disposed at the effective projection light-absent region. The limiting mechanism includes a plate member having a buckling load resistance, and pins connecting the opposite ends of the plate member respectively to the elongated screen and a fixed position in such a manner that the elongated screens are free to move vertically. A pillar member is used for fixing the end of the plate member, and a space between a support base supporting the unit projectors and the pillar members is used as a maintenance screen.

25 Claims, 23 Drawing Sheets

FIG. 28
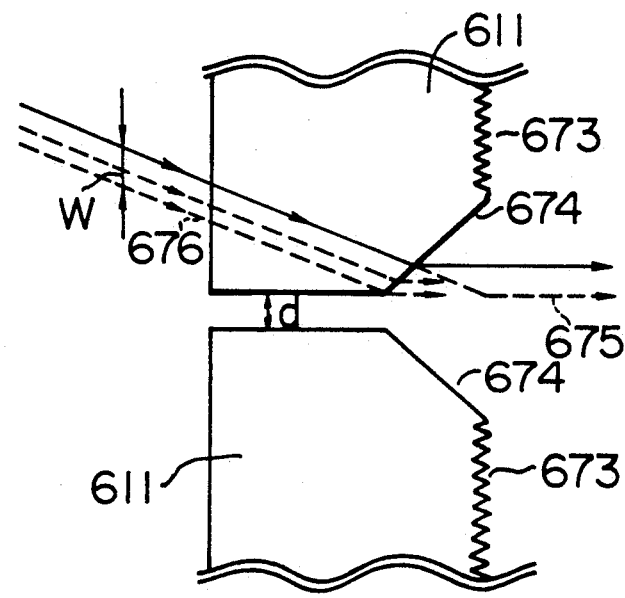
FIG. 29A  FIG. 29B  FIG. 29C
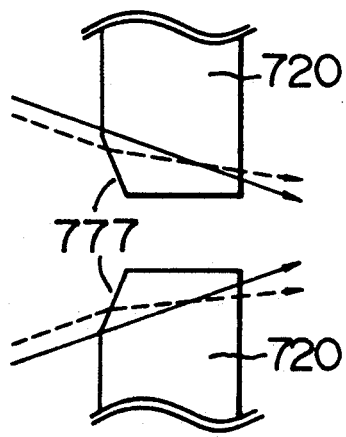 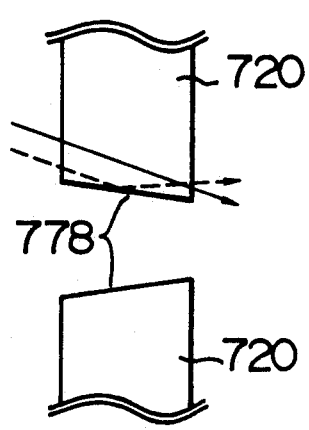 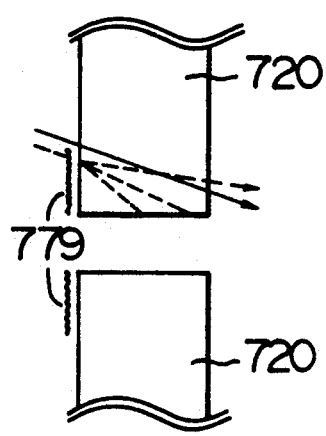

F I G. 35
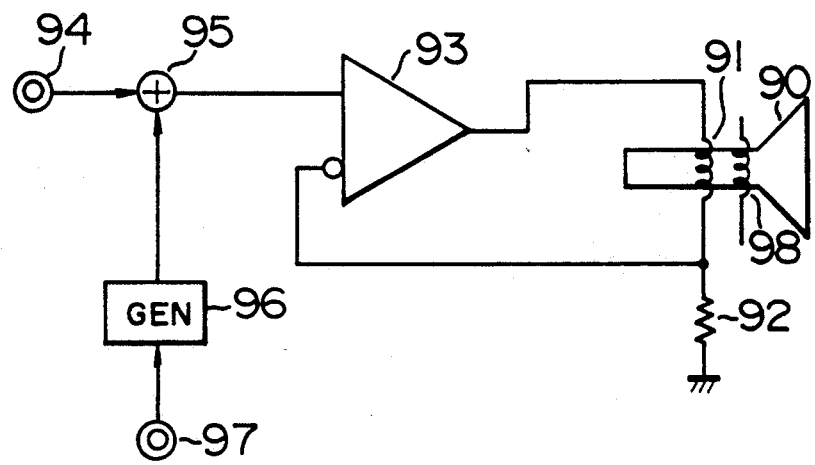
F I G. 36
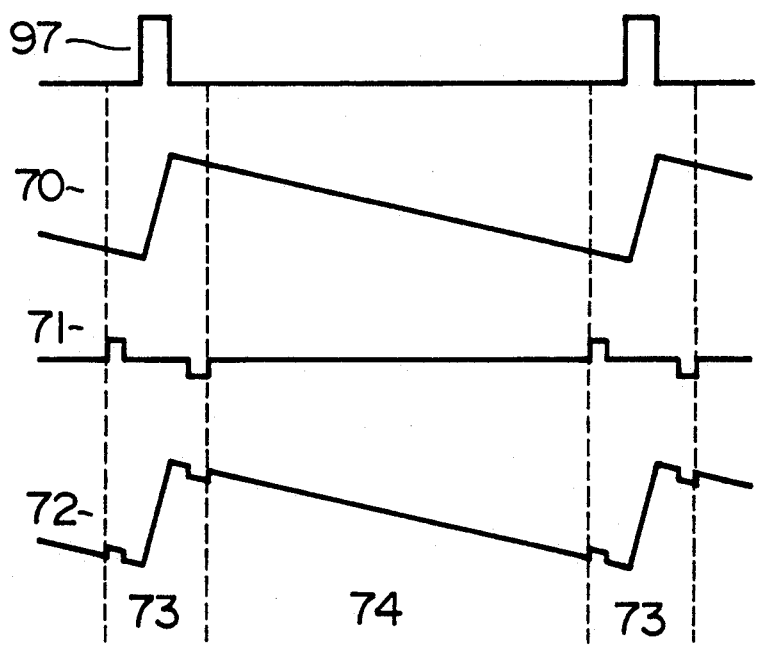

MULTI-SCREEN PROJECTOR

BACKGROUND OF THE INVENTION

This invention relates to a multi-screen projector which comprises a plurality of unit projectors and a multi-screen formed by a combination of unit screens corresponding respectively to the unit projectors. More particularly, the invention relates to a mounting mechanism for enabling a vertical adjustment of the position of the multi-screen and for enabling a horizontal movement of the multi-screen, and also relates to the construction of a transmissive screen.

A multi-screen projector is a projector having an enormous screen formed by arranging unit projectors in n rows in a vertical direction and in m columns in a horizontal direction (n and m are arbitrary numbers). FIG. 1 shows a multi-screen projector with two rows and two columns of unit projectors. In FIG. 1, reference numerals 1, 2, 3 and 4 denote the unit projectors, respectively, and reference numerals 5, 6, 7 and 8 denote transmissive unit screens, respectively.

Conventional multi-screen projectors have been a mere stack of ordinary unit TV projectors for home use which are combined with unit screens. Therefore, as shown in FIG. 1, a non-transparent structural body, formed as a result of connecting the adjacent unit screens together, has been present in a shaded part 9 (the default band along the peripheries of the unit screens). As a result, a shadow due to the non-transparent structural body has been unavoidable in that portion of the enormous screen on which a picture image is desired to be displayed. When the unit screen is about 800 mm wide, the width of the shadow has been about 8 mm or more, i.e., 1% or more of the width of the unit screen. Since the pixel size for a unit TV projector is about 0.2% of the width of the screen unit, the above shadow whose width is 1% or more of that of the unit screen is equivalent to about 5 pixels or more.

FIG. 2 shows a typical construction of a unit screen with the diagonal about 40 inches. FIG. 2 is an example of a two-sheet construction. As viewed from the observer's side, a Fresnel sheet 11 is disposed at the back side of the unit screen, and a front sheet 12 is disposed at the front side. The Fresnel sheet 11, about 3 mm thick, converts incident light, coming in a macroscopically diverging manner from a projection lens (not shown in FIG. 2) behind it, into collimated projection light. The Fresnel lens, in other words, functions the same way as a single convex lens.

The front sheet 12 comprises vertical lenticular stripes 14 and vertical black stripes 13. The lenticular stripes microscopically diffuse the light in the horizontal direction, that is, increases the horizontal directivity angle. A detailed example of its construction is described in U.S. Pat. No. 4,536,056 filed by the inventor of the present invention.

FIG. 3 shows a lenticular sheet 16 which diffuses the light in the vertical direction. As shown in FIG. 3, horizontal lenticular stripes are formed on its light incident surface and light-outgoing surface so that the light can be microscopically diffused in the vertical direction. The lenticular sheet 16 is interposed between the Fresnel sheet 11 and the front sheet 12 (both of which are shown in FIG. 2), and thus these three sheets jointly constitute a three-layer sheet.

Incidentally, there has also been used another method in which the lenticular lens 16 is not used, and instead diffuser elements (e.g. particles of $SiO_2$) which diffuse the light microscopically and randomly are admixed with the front sheet 12 of FIG. 2.

Each of the three sheets 11, 12 and 16 shown in FIGS. 2 and 3 is composed of a transparent resin belonging to a methacrylic resin or a polystyrene resin. Therefore, they expand and contract according to the ambient temperature, and their temperature coefficient is about 60 PPM/°C.

These sheets also expand and contract according to a change of the ambient humidity, and the line expansion rate is about 400 PPM for the methacrylic resin-type sheet and about 100 PPM for the polystyrene resin-type per 10% increases of the relative humidity.

Sometimes, a change in humidity, due to the large time constant, is transiently responded by an unbalanced state of a water absorption profile of the sheet in the direction of the depth thereof. In such a case, there has been encountered a problem that the front sheet 12 is deformed into a curved shape. To overcome this problem, it has been necessary in the prior art to retain each unit screen by a frame provided at the shaded part 9 of FIG. 1 and along the outer peripheral edge of the overall screen. Therefore, a shadow of a great width has unavoidably been produced at the joint portion (boundary band) between any two adjacent unit screens.

Japanese Patent Unexamined Publication No. 1-134491 discloses a construction in which right and left edge portions of a screen are fastened by screws. This construction has a drawback that the shadows of the screws appear on the display screen, so that important information fails to be displayed.

In conventional devices, as disclosed in Japanese Patent Unexamined Publication No. 1-134491, the problem has been dealt with by increasing the size of the through holes (for mounting the screen) or by applying a resilient pressing means to an upper hanging portion. In the prior art, no problem has been encountered when two columns of unit screens are used; however, in the case of several columns of unit screens, the multi-screen expand and contract to a greater degree, so that this could not be dealt with.

In a conventional n-row multi-screen, it is necessary to vertically arrange n rows of Fresnel sheets (which constitute a screen) between a front sheet and a reinforcing sheet. However, since a concentrically-shaped Fresnel lens is formed on one surface of the Fresnel sheet, the n rows are not constituted by a single sheet, and generally the n rows are constituted by n sheets. Therefore, when the n rows of Fresnel sheets 22 are attached by screws 25 to the reinforcing sheet as shown in FIG. 4, the shadows of the screws 25 are displayed on the display screen, thus adversely affecting the picture.

In a multi-screen of the n-row and m-column type, the size of the overall screen is very large, and it is difficult to obtain the precision of the mounting portions. However, unless the n-row and m-column screen is accurately arranged, a spacing is formed between the m columns of screens, or a vertical step is formed between the n rows of screens, so that the picture is affected at the boundary band between the adjacent screens.

Also, the size of the multi-screen becomes very large. For example, when the unit screens of 50-inch size are arranged in four rows and four columns, the size of the overall screen is 3.5 m in height and 4.2 m in width, and the amount of expansion and contraction due to a temperature change is as large as about 10 mm. Therefore, when the screen is fixed by the screws, the screen is broken or corrugated due to the expansion, thus greatly affecting its performance.

In order to minimize the above shadows, the inventor of the present invention has already filed a patent application directed to the construction shown in FIG. 5.

FIG. 5 shows two of units screens composing a multi-screen. In FIG. 5, reference numeral 11 denotes the same Fresnel sheet as the Fresnel sheet 11 in FIG. 2. The size of this sheet is about 40-inch size, that is, 800 mm in width, 600 mm in height and about 1 to 3 mm in depth. As shown in FIG. 6, the Fresnel sheet in an unloaded state has a one-dimensional curvature such that the Fresnel sheet is curved or warped toward the observer's side. It is known that such one-dimensional curvature can be imparted to the Fresnel sheet by forcibly applying a one-dimensional curvature to an ordinary planar Fresnel sheet and then by leaving the thus curved Fresnel sheet in an environment of a plastic deformation temperature of about 80° C. or higher. As later described in detail, the radius of the one-dimensional curvature is determined to be about 10 to 30 m.

Reference numeral 21 in FIG. 5 denotes a hole formed in the Fresnel sheet 11, and reference numeral 22 denotes a wire. The material for the wire 22 is metal such as stainless steel or a plastics material such as nylon. The wire may be a single wire or be made of twisted strands, but the outer diameter of the wire is smaller than the size of a pixel on the display screen. Each wire 22 passes through the holes 21, and applies a tension to the Fresnel sheet 11 at least in a direction to bind the Fresnel sheet 11 to a reinforcing sheet 20.

Reference numeral 23 denotes a coil spring which is usually made of a metal wire. Reference numeral 24 denotes a rigid support body, and is made of metal or a plastics material. Each coil spring 23 is supported at one end on the support body 24, and applies a tension to the corresponding wire 22. This tension is transmitted to the Fresnel sheet 11 via the wire 22 so as to bind the left edge of the Fresnel sheet 11 to the reinforcing sheet 20.

The rigid support body 24 is located in a free space or region not to cause any shadow on the screen. This free space is shown in FIG. 9.

Although only the supporting structure for the left edge of the unit screens is shown in FIG. 5, the same structure is also applied to the upper, lower and right edges of the unit screen, though this is omitted in FIG. 5 for the simplicity of the illustration.

Note that at each of the upper and lower edges, the wire 22 passes through holes 25 formed through the Fresnel sheet 11 and the reinforcing sheet 20. Although many holes 25 are provided, only one of them is shown in FIG. 5 for illustration purposes.

FIG. 7 is a perspective view of the structure of the completely connected-type left edge of the combination of an elongated front sheet 12, the reinforcing sheet 20 and the Fresnel sheets 11 both of which are shown in FIG. 5. Reference numerals 22, 23 and 24 denote a wire, a coil spring and a support body, respectively. Reference numeral 21 denotes a hole formed in the Fresnel sheet 11 and the Fresnel sheet 11. Each wire 22 passes through the holes 21, and is extended along the side surface of the reinforcing sheet 20, and is connected to the coil spring 23. Therefore, the tension of the coil spring 23 applies component forces to the front sheet 12 and the Fresnel sheets 11 so as to bind them to the reinforcing sheet 20.

Although only the left edge portion of the supporting structure is shown in FIG. 7, the same structure is used at the right edge portion. Reference numeral 25a denotes a hole formed through both the front sheet 12 and the reinforcing sheet 20. A threaded rod (not shown) is extended through the hole 25a, so that the front sheet 12 is fixedly hung on the reinforcing sheet 20. Although not shown in FIG. 7, the upper and lower edges of the Fresnel sheet 11 are supported by the wires passing through the holes 25a described above in FIG. 5.

FIG. 8 shows a conventional multi-screen. In FIG. 8, reference numeral 20 denotes an elongated reinforcing sheet for each column, and reference numeral 12 denotes an elongated front sheet for each column, and reference numeral 11 denotes a Fresnel sheet of about 40-inch size. Although not shown in this Figure, the supporting structures between these sheets are as described above.

The above conventional construction has a problem that in the event of an earthquake, the reinforcing sheet 20 is much swung in a direction perpendicular to the plane of the screen. Another problem is that due to variations in warp or curvature of the reinforcing sheets, some parts of the screen are displaced out of position in forward and backward directions, thus detracting from the appearance. Further, in order to support the weight of the Fresnel sheet 11, the through holes 25a are formed through the reinforcing sheet 20, and the thin wires are passed through these holes, respectively; however, this operation can not be carried out easily. A further problem is that each hole 25a causes its shadow to appear on the picture. Furthermore, it has been desired to further decrease the discontinuity of the picture at the boundary band between the adjacent unit screens.

SUMMARY OF THE INVENTION

It is an object of this invention to provide a multi-screen projector which is provided with a multi-screen of an excellent construction free from the above problems.

Another object of the invention is to provide a method of mounting Fresnel sheets between a front sheet and a reinforcing sheet in such a manner that shadows of mounting screws do not appear.

A further object of the invention is to provide a multi-screen projector in which in the screen liable to a large dimensional variation, adjacent unit screens can be connected together precisely, and the unit screens can be arranged precisely relative to projectors.

To achieve the above objects, in the present invention, a support member is mounted on a lower end portion of a reinforcing sheet at a light-outgoing side thereof, and sheets (Fresnel sheets) are interposed between a front sheet and the reinforcing sheet in a stacked manner. Wires and springs are connected to the right and left edges of the Fresnel sheet so as to apply tension to lift the Fresnel sheet, etc.

To achieve the above objects, in the present invention, a support portion for hanging the reinforcing sheet can be adjusted by a set screw to be moved vertically. With this arrangement, an inclination of each row of screens, as well as a vertical step in the screens, is eliminated. Then columns of screens are fixed at one point, and the screen can move in response to thermal expansion and contraction, but the relative position between the screens and the projectors is not changed by an external force such as an earthquake.

In the present invention, in order to overcome the displacement of the multi-screen in a z-direction perpendicular thereto (more specifically, the relative displacement between the adjacent screens) and also to overcome the problem of an earthquake, relative displacement prevention means for preventing the relative displacement, as well as z-direction displacement-limiting means, is provided at each joint or boundary band between the adjacent unit screens.

Shelf means for supporting at least the weight of the Fresnel sheets is fixedly mounted on the lower end portion of the reinforcing sheet. Overscan light urging deflection means for amending light loss are provided at the four sides of the periphery of the unit Fresnel sheet.

With respect to the relative displacement prevention means provided at each joint, a drilled hole is formed in the side surface of the reinforcing sheet, and a common pin is inserted into the holes in the opposed side surfaces of the adjacent reinforcing sheets, thereby preventing the relative displacement between the adjacent reinforcing sheets. With respect to the z-direction displacement-limiting means for preventing vibration to solve the earthquake-resistant problem, a pin insertion hole is formed in one end of a connecting plate, and the above common pin is inserted into this hole, thereby connecting the connecting plate to this pin, and the other end of the connecting plate is connected to an absolute displacement-limiting support member (absolute fixing member) disposed rearwardly of the screen including the reinforcing sheet, etc., thereby preventing the z-direction (i.e., the direction perpendicular to the plane of the screen) displacement of the screen including the reinforcing sheet, etc.

The above-mentioned shelf means supports the weight of the lowermost or first Fresnel sheet. The second Fresnel sheet immediately above the lowermost Fresnel sheet is supported by the upper side surface or edge of the lowermost Fresnel sheet. Similarly, each of the other Fresnel sheets are supported by the Fresnel sheet immediately below it. Thus, eventually, the total weight of the Fresnel sheets is supported by the shelf means.

The overscan light urging deflection means increases the amount of deflection of the light on the four sides of the unit Fresnel sheet so that the light can be directed toward the effective field of vision. Therefore, this means increases the amount of transmission of the projection light through the screen at the four sides. Therefore, the light loss at the boundary band between the unit screens can be compensated for. Therefore, the uniformity of the picture image can be improved.

BRIEF DESCRIPTION OF THE DRAWINGS

FIG. 28 is an enlarged view of a default band between unit Fresnel sheets, showing a sixth embodiment of the invention;

FIGS. 29A, 29B and 29C are horizontal cross-sectional views of reinforcing sheets, showing 7th to 9th embodiments of the invention;

FIG. 35 is a circuit diagram showing an important portion of a fourteenth embodiment of the invention;

FIG. 36 is an illustration showing operating waveforms of the circuit of FIG. 35;

DESCRIPTION OF THE PREFERRED EMBODIMENTS

A first embodiment of the present invention will now be described with reference to FIGS. 9 and 10.

Figure 9:
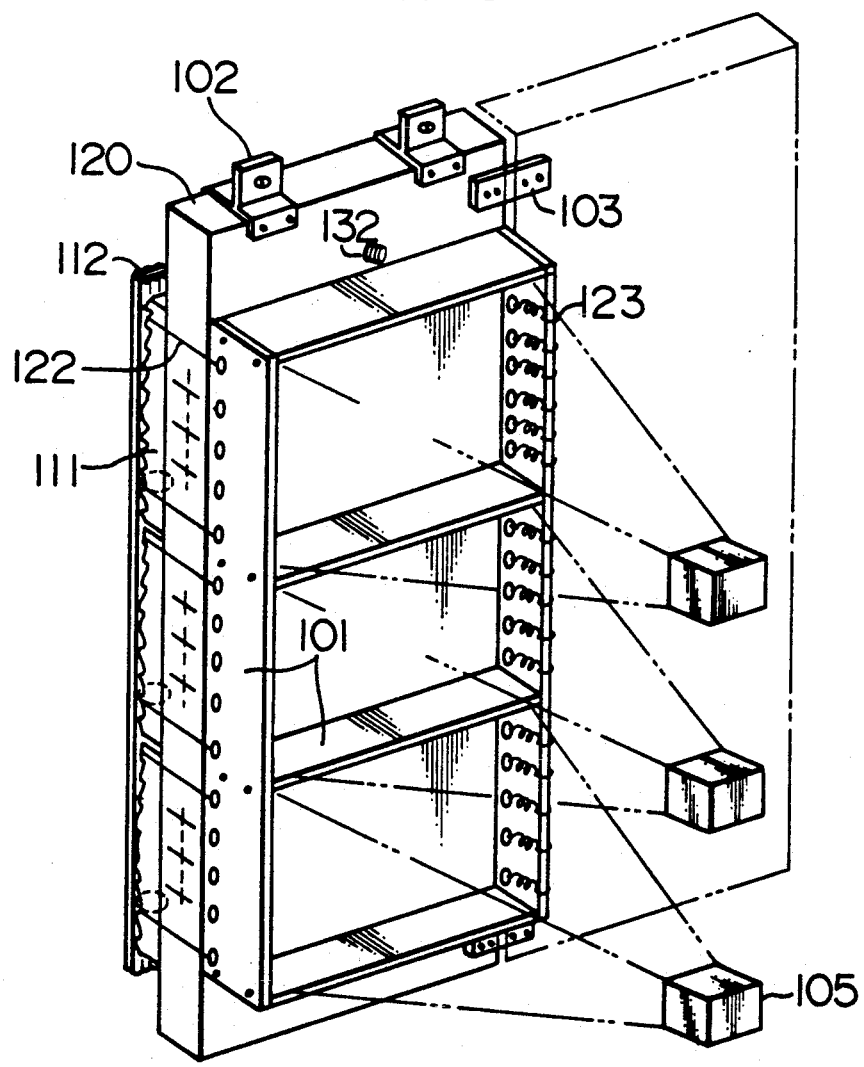
FIG. 9 is a perspective view of a multi-screen projector according to a first embodiment of the present invention, as viewed from the projection side.
Figure 11:
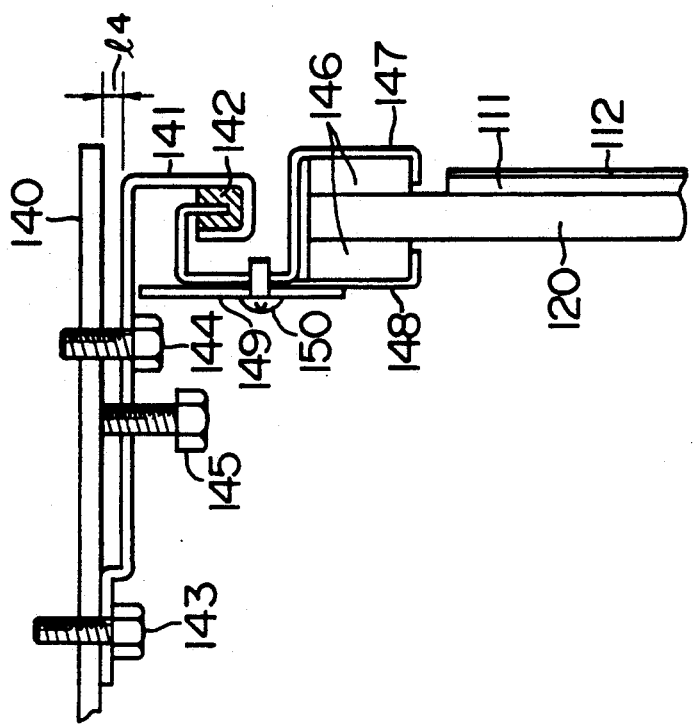
FIG. 11 is a side-elevational view of a hanging portion of the multi-screen.

FIG. 9 is a perspective view of the specific embodiment of the invention as viewed from the side of projectors 105, in which multi-screens of n-row and one-column type are arranged in m columns.

In FIG. 9, reference numeral 112 denotes a front sheet having vertical lenticular stripes and black stripes formed thereon. The lenticular stripes microscopically diffuse light in a horizontal direction. Reference numeral 111 denotes a Fresnel sheet having a Fresnel lens formed on one surface thereof. The Fresnel sheet 111 converts incident light into collimated projection light or the like. Reference numeral 120 denotes a reinforcing sheet for mounting the front sheet 112, the Fresnel sheet 111, etc., in a reinforcing manner.

Reference numeral 101 denotes light shielding members fixedly secured to the reinforcing sheet 120 by screws or the like. Reference numeral 122 denotes a wire which fixedly supports the Fresnel sheet 111 and the front sheet 112. Reference numeral 123 denotes a coil spring connected to the wire 122. The sheets 111 and 112 are bound to the reinforcing sheet 120 by the wires 122 and the coil springs 123 which are engaged with the shielding members 101 to pull the sheets 111 and 112. With respect to the Fresnel sheets 111, unit Fresnel sheets are supported in n rows by the wires 122 separately from one another, or in bonded relation to one another. Each front sheet 112 constitutes one vertical column (The front sheet 112 may be composed of unit sheets bonded together).

Figure 4:
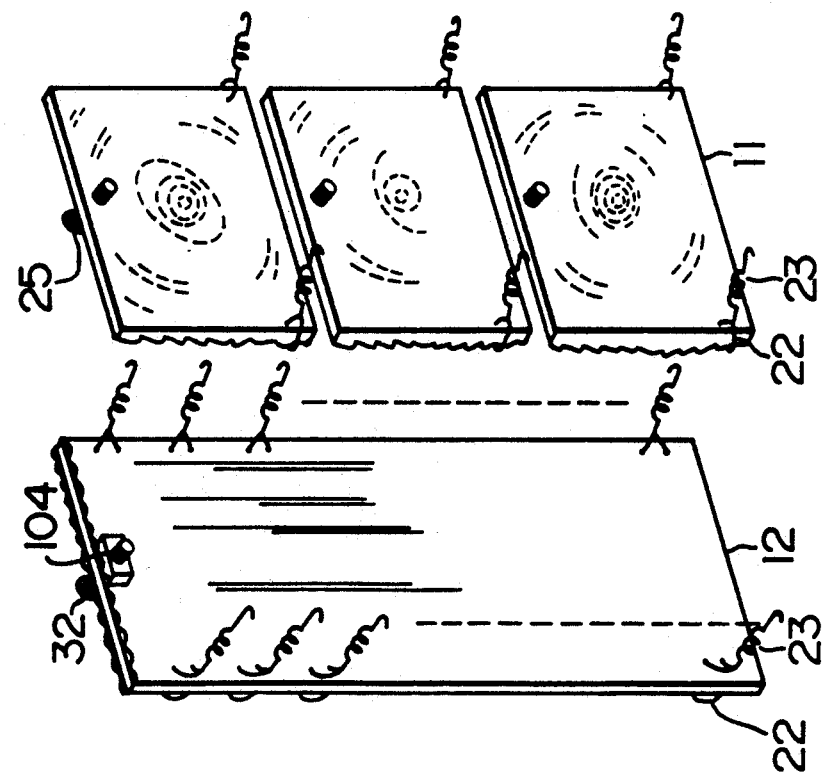
FIG. 4 is a perspective view of the prior art in which a Fresnel sheet is mounted by screws, wires and springs.
Figure 7:
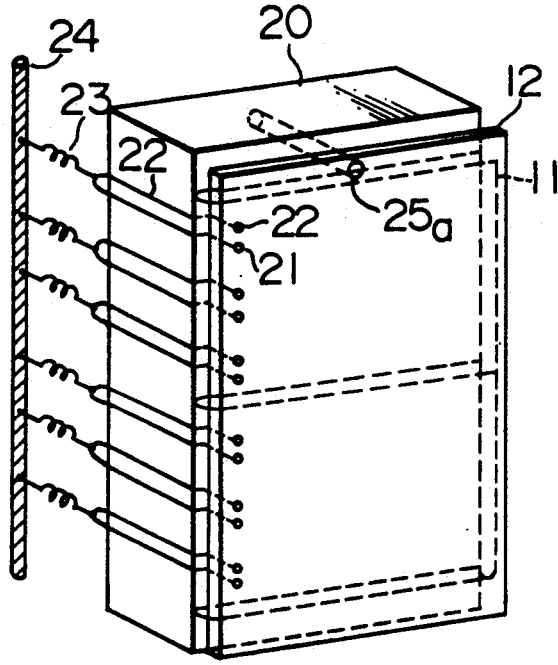
FIG. 7 is a perspective view of a conventional screen, showing a completely-connected type left end structure thereof.
Figure 8:
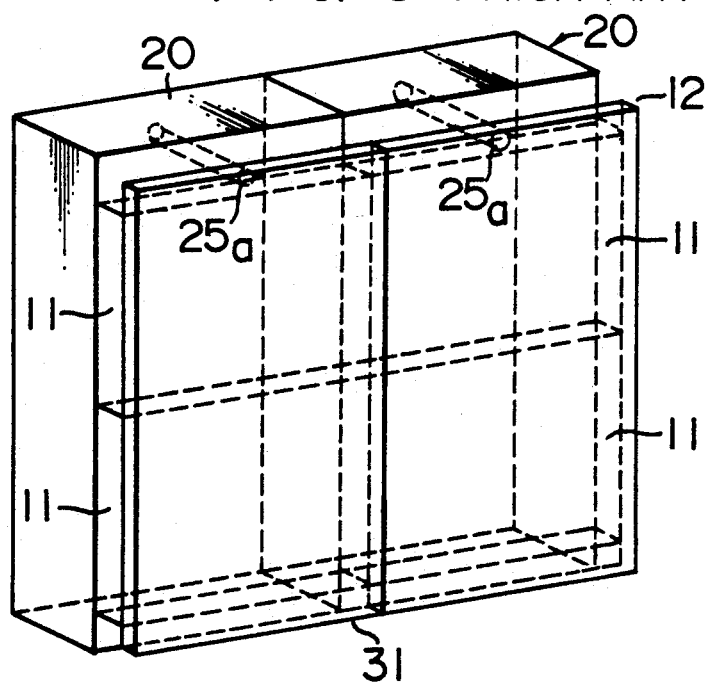
FIG. 8 is a perspective view of a conventional multi-screen.

Reference numeral 132 denotes a screw for hanging the front sheet 112 on the reinforcing sheet 120. The front sheet 112 is thin (that is, has a thickness of about 1 mm), and therefore when the front sheet 112 covering the n rows is supported by one screw 132, the front sheet may be insufficient in strength. In such a case, as shown in FIG. 4, a reinforcing piece 104 is bonded to the front sheet 112 to reinforce the hole formed through the front sheet 112 through which hole the screw 132 is passed. Reference numeral 102 in FIGS. 9 and 10 denotes a hanging mechanism for hanging the reinforcing sheet 120. The m columns of reinforcing sheets 120 are connected together by connecting mechanisms 103.

The mounting means for the Fresnel sheets 111 will now be described in detail.

Figure 10:
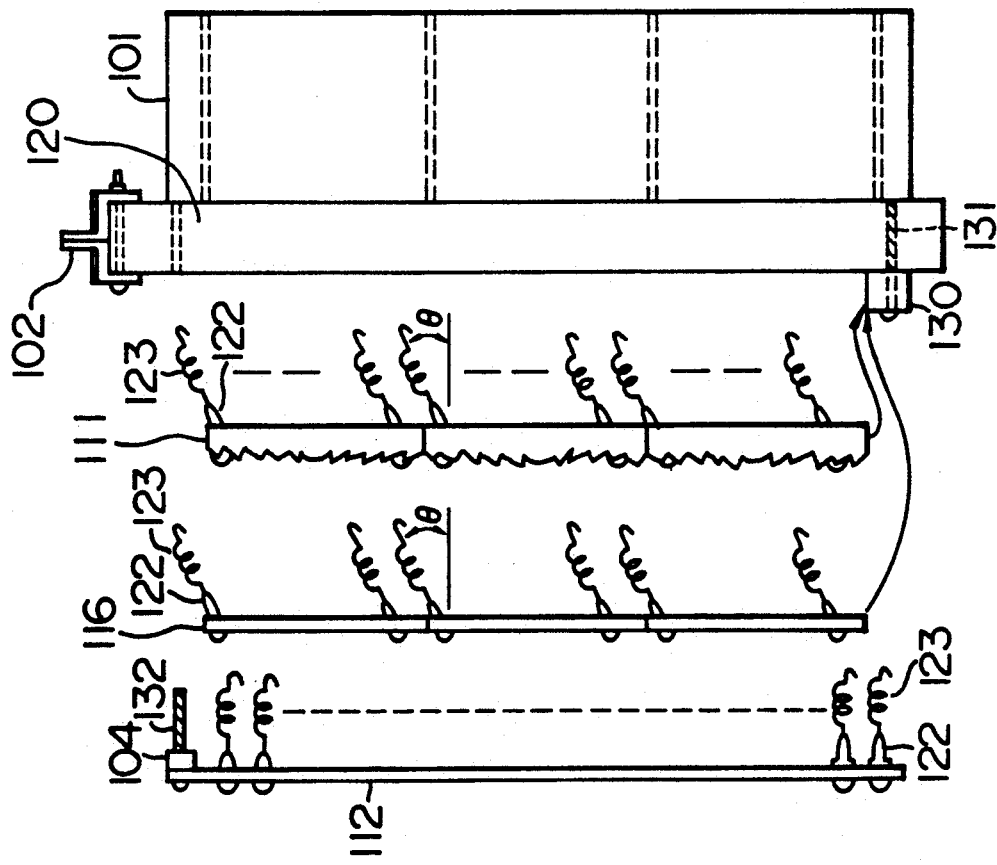
FIG. 10 is an exploded side-elevational view of the embodiment of FIG. 9.
Figure 12:
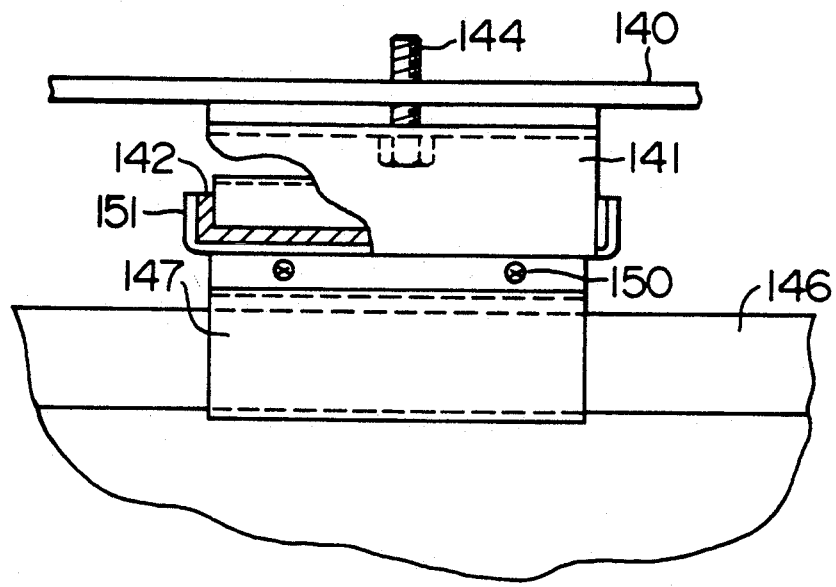
FIG 12 is a front-elevational view of the hanging portion of FIG. 11.
Figure 13:
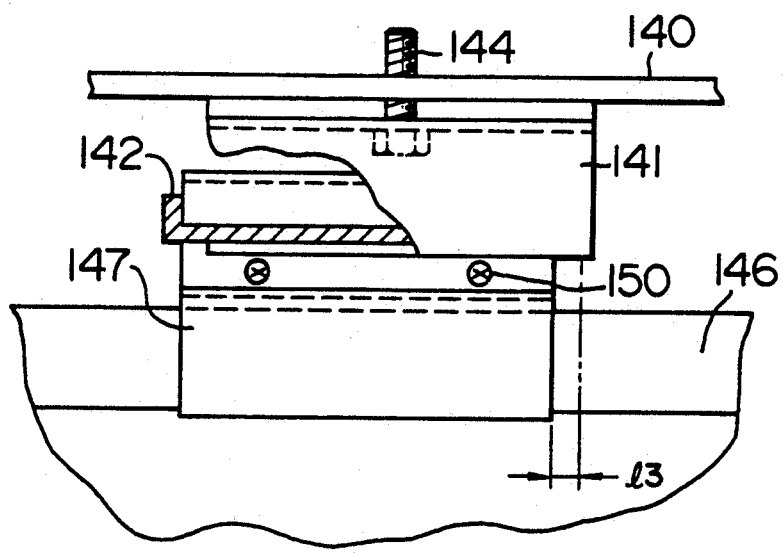
FIG. 13 is a view similar to FIG. 12, but showing the condition in which the multi-screen is moved a distance due to a temperature change.
Figure 14:
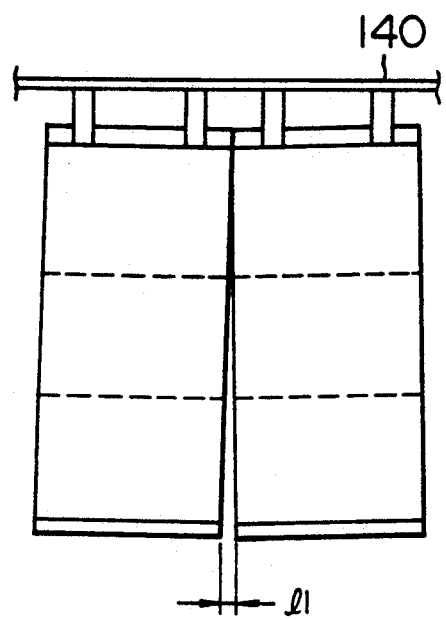
FIG. 14 is a view showing the condition in which a gap is formed in the lower portion of the multi-screen.
Figure 15:
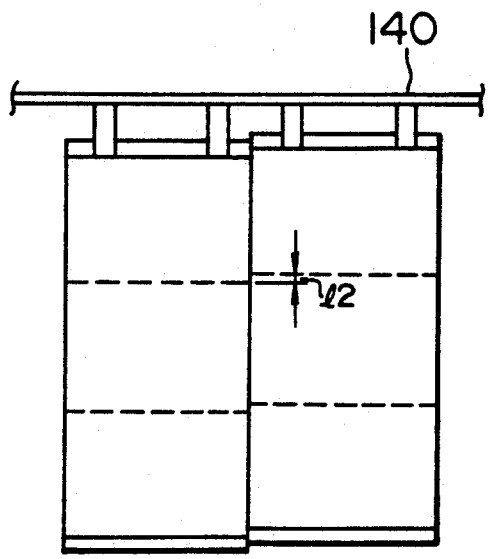
FIG. 15 is a view showing the condition in which a vertical step is formed in the multi-screen.

FIG. 10 is an exploded, side-elevational view of the first embodiment of FIG. 9, showing an important portion thereof in detail.

In FIG. 10, reference numeral 130 denotes a convex support piece provided on the lower portion of the light-outgoing surface of the reinforcing sheet 120. The support piece 130 is fixedly secured to the reinforcing sheet 120 by an adhesive or by a screw 131. The Fresnel sheet 111 of the first row is placed on the support piece 130, and the Fresnel sheet 111 of the second row is placed on the Fresnel sheet 111 of the first row. Similarly, the Fresnel sheet 111 of the n row is placed on the Fresnel sheet 111 of the preceding row. When the Fresnel sheet 111 is expanded or elongated due to a temperature change, the lower Fresnel sheet 111 can not be easily expanded upwardly, since the lower Fresnel sheet 111 bears the load or weight of the upper Fresnel sheet 111. Therefore, the wires 122 and the coil springs 123 (which are engaged with the shielding members 101 so as to bind the Fresnel sheet 111 to the reinforcing sheet 120) are mounted in such a manner that the wires 122 and the coil springs 123 are inclined upwardly at an angle of $\theta$, thereby applying a tension to the Fresnel sheet 111 to lift the same. The Fresnel sheet of 50-inch size is about 3 mm in thickness, and is about 3 kg. Therefore, when four coil springs each having a tension of 600 g are connected to each of the right and left edges of the Fresnel sheet 111, the tension of 4.8 kg is obtained. In this case, when the tension angle $\theta$ is set to 18°, the following formula is obtained:

$$F' = F \sin \theta$$

The component force F' lifting the Fresnel sheet 111 is 1.5 kg, and the load is reduced about 50%, and therefore the Fresnel sheet 111 can be expanded and contracted easily.

In FIG. 10, reference numeral 116 denotes a prism sheet refracting the light in the vertical direction. The prism sheet 116 is provided for the purpose of converging or diverging the projection light toward the observer's side. The prism sheets 116 are supported on the support piece 130 in a stacked manner as described above.

The prism sheet 116 is about 1 mm in thickness, and is about 1 kg in the case of the 50-inch size. When two coil springs each having a tension of 500 g are connected to each of the right and left edges of the prism sheet 116, with the tension angle $\theta$ set to 14°, the vertical component force lifting the prism sheet 116 is about 0.5 kg, and therefore the load of the prism sheet 116 is reduced about 50%. Therefore, since the conditions for the Fresnel sheets 111 and the prism sheets 116 vary from one row to another, the direction of F, the tension angle $\theta$ and the tension are suitably selected for each sheet.

FIGS. 11 to 15 show the mounting mechanism of the first embodiment of the invention.

Hanging reinforcement bars 146 are bonded or screwed to the upper end portion of the reinforcing sheet 120 of the screen. Screen-hanging metal members 147 and 148 are secured to the screen-hanging reinforcement bars 146, and a receptive member 142 of a plastics material is attached to the distal end of a hook portion of the member 147. A screen support metal member 141 is fixedly secured to a screen support base 140 by a fixing screw 143. The distal end portion of the support metal member 141 has a U-shaped cross-section, and the support metal member 141 is spaced a distance $l_4$ from the support base 140 except at the fixing screw 143. A set screw 144 is provided in the vicinity of the screen hanging portion, and the set screw 144 is threaded into the support base 140. A stopper screw 145 is provided near the set screw 144, and is threaded through the support metal member 141. A disengagement prevention member 149 is secured to the screen-hanging metal members 147 and 148 so as to prevent the disengagement of screen-hanging metal members 147 and 148.

The operation will now be described. If the mounting precision is not obtained upon mounting of the screens on the screen support base 140, a gap $l_1$ (FIG. 14) or a step $l_2$ (FIG. 15) is produced between the screens. In order to remove such a gap and such a step, the set screw 144 is rotated. For example, for lifting the screen, the stopper screw 145 is loosened, and the set screw 144 is tightened, so that the support metal member 141 is deformed and lifted upwardly since the screen support base 140 has a sufficient strength. In this manner, the screen can be lifted. In contrast, for lowering the screen, the set screw 144 is loosened, so that the support metal member 141 is deformed due to the weight of the screen by an amount corresponding to the amount of loosening of the set screw 144. As a result, the screen is lowered. After the upward/downward adjustment of the screen, the stopper screw 145 is tightened to abut against the screen support base 140, so that the screen is held against upward and downward movement. To deal with a thermal expansion of the screen, the screen-hanging metal member 147 is hooked on the support metal member 141, and the receptive member 142 of a plastics material is provided between the hanging metal member 147 and the support metal member 141. When the reinforcing sheet 120 is thermally expanded, the hanging metal member 147 and the receptive member 142 are moved together with the reinforcing sheet 120, so that the receptive member 142 slides relative to the support metal member 141. Since the receptive member 142 is provided for enabling an easy sliding movement, it is made of a material having a low friction coefficient.

If all the hanging portions of the screens are designed to be slidable, the hanging portions are caused to slide in the event of an earthquake or the like, and vigorously impinge on the disengagement prevention member or the screen support base. This is dangerous. To prevent this and also to prevent a change of the relative position between the projectors and the screens, the support metal member 141 provided near the central portion of the screen is bent as at 151 in FIG. 12 so as to fix the hanging metal member 147 against movement.

Figure 16:
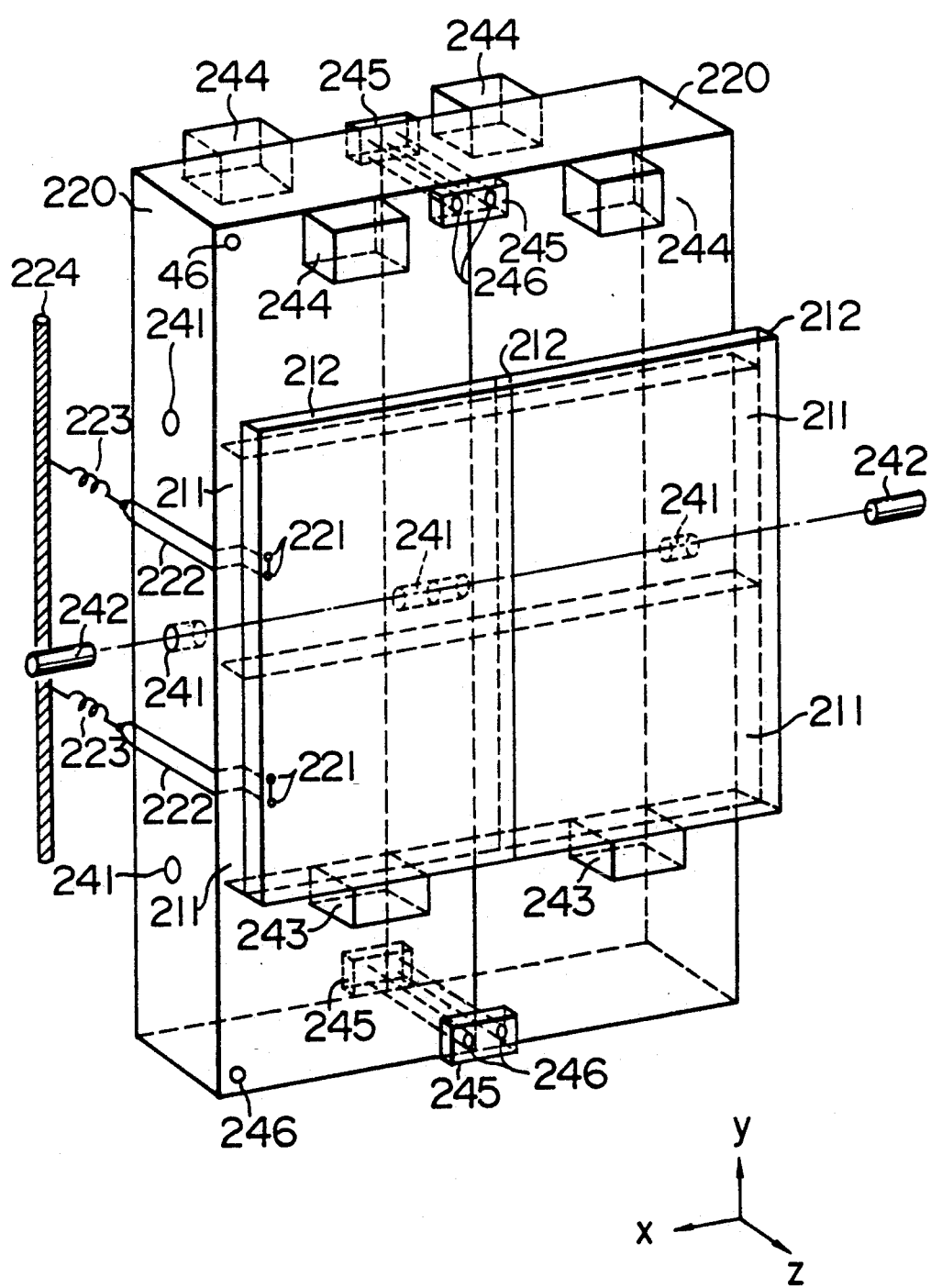
FIG. 16 is a perspective view of a second embodiment of the invention.

FIG. 16 shows the construction of a multi-screen of a multi-screen projector according to a second embodiment of the invention.

The multi-screen shown in FIG. 16 is composed of a plurality of elongated screens arranged side by side in right and left directions. Relative displacement prevention means for preventing relative displacement between the elongated screens at their right and left adjacent portions in the forward and backward directions (i.e., z-direction) is provided at an effective projection light-absent space or region where the projection light projected from projectors on the screens is not hindered.

The elongated screen comprises an elongated reinforcing sheet 220, an elongated front sheet 212, and an elongated Fresnel sheet 211 sandwiched between the sheets 220 and 212. A shelf 243 is fixedly secured to the elongated reinforcing sheet 220 adjacent to the lower end of the elongated screen. Wires 222 and coil springs 223 are extended between the elongated front sheet 212 and predetermined absolute fixing positions, and the wires 222 and the coil springs 223 apply component forces to the elongated front sheet 212, so that the front sheet 212 is pulled toward and bound to the elongated reinforcing sheet 220 via the Fresnel sheet 211. The weight of the elongated Fresnel sheets 211 is supported by the shelf 243 fixedly secured to the elongated reinforcing sheet 220. Although a number of means (i.e., the wires 222, the coil springs 223, etc.) for binding the front sheet 212 to the reinforcing sheet 220 are used, several of them are shown here for the simplicity of the illustration.

In FIG. 16, reference numeral 241 denotes a pin insertion hole, and this hole 241 has a diameter of about 3.5 mm (hereinafter, numerical values are indicated by way of example) and a depth of about 17 mm. The hole 241 will not produce a shadow by the projection light, as later described. Reference numeral 242 denotes a pin to be inserted into the hole 241. The pin 242 has a diameter of about 3 mm and a length of about 32 mm. The pin 242 is made of metal or a plastics material such as polyacetal. The thickness of the reinforcing sheet 220 is about 12 mm. The unit Fresnel sheet 211 has a thickness of about 3 mm, and has a diagonal length of about 50 inches (1.25 m). The thickness of the front sheet 212 is about 1 mm. The front sheet 212, as well as the reinforcing sheet 220, is formed into a very long shape by continuously combining unit sheets together in the longitudinal direction.

The shelf 243 supports at least the weight of the Fresnel sheets 211. In FIG. 16, the shelf 243 supports not only the weight of the Fresnel sheets 211 but also the weight of the front sheet 212. The shelf 243 is made of metal or a plastics material. The shelf 243 is fixedly secured to the reinforcing sheet 220 by screws or an adhesive. The depth of the shelf 243 is, for example, about 4 mm.

An interface portion 244 serves to hangingly support the overall weight of the screen through separate hanging means (not shown). The interface portion 244 is made of metal or a plastics material. The interface portion 244 is fixedly secured to the reinforcing sheet 220 by screws or an adhesive. A metal plate 245 fixedly interconnects two elongated reinforcing sheets 220 disposed adjacent to each other in the horizontal direction. The metal plate 245 is fixedly secured to the sheets 220 by screws 246. The description of the construction of FIG. 16 has now been finished, and next the operation thereof will now be described.

The pin 242 is inserted in the holes 241 formed in the side walls of the adjacent reinforcing sheets 220. Therefore, the pin 242 serves to make uniform the displacement of the reinforcing sheet 220 in the z-direction (i.e., in the thicknesswise direction of the thickness of the screen or in the forward-backward direction). In other words, the pin 242 serves to prevent a non-uniform step from being formed between the two right and left adjacent reinforcing sheets 220 in the forward-backward direction. The shelf 243 serves to support the weights of the Fresnel sheets 211 and the front sheet 212. The front sheet 212 is urged toward the reinforcing sheet 220 by the coil springs 223. The Fresnel sheets 211 are also urged toward the reinforcing sheet 220 via the front sheet 212. Therefore, the Fresnel sheets 211 and the front sheet 212 are prevented from becoming disengaged from the shelf 243, thus preventing the dropping of the sheets 211 and 212.

Figure 5:
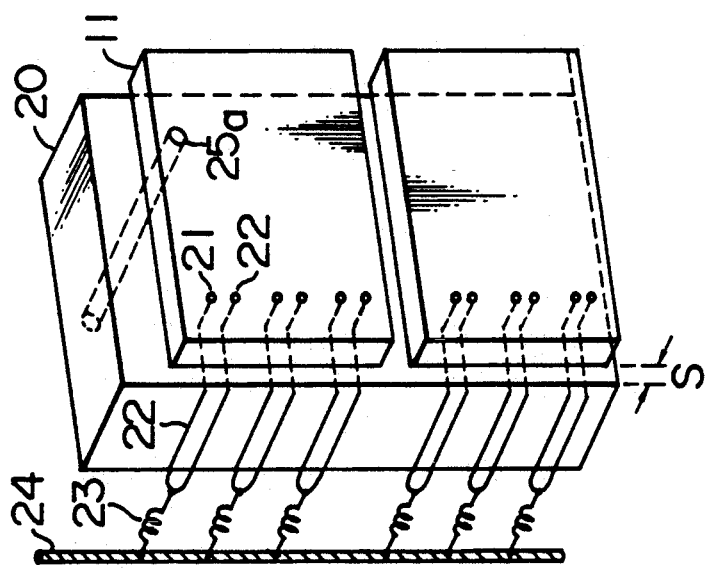
FIG. 5 is a perspective view of a conventional screen.

Therefore, the screw holes 25a (which serve to support the Fresnel sheet on the reinforcing sheet 20) shown in the prior art of FIG. 5 can be omitted. Therefore, the harmful shadows of the screws inserted into the screw holes 25a are not produced, thereby enhancing the quality of the reproduced image. Further, in FIG. 16, the weight of the upper one of any two vertically-adjacent Fresnel sheets 211 is supported by the lower one, and the two Fresnel sheets 211 are automatically held in intimate contact with each other under the influence of the gravity. Therefore, the discontinuous width of the horizontal stripe-like default band (joint) between the two vertically-adjacent Fresnel sheets 211 can be minimized.

Figure 17A:
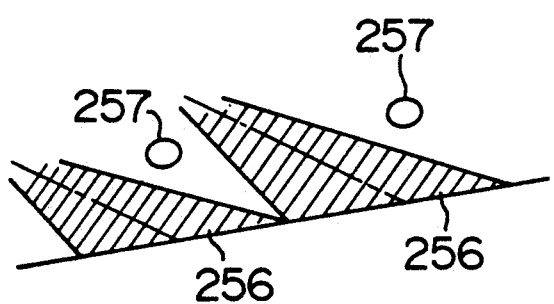
FIGS. 17A and 17B are a plan view and a side-elevational view of the second embodiment, showing free spaces and prohibiting spaces.
Figure 17B:
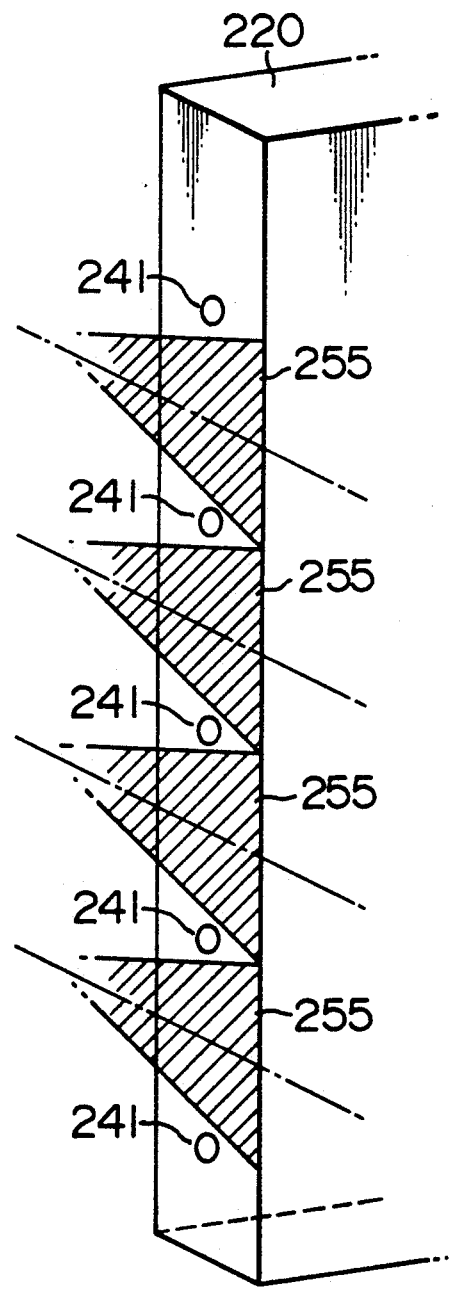

FIGS. 17A and 17B correspond to a side-elevational view of the second embodiment of FIG. 16, and show the free space (i.e., the effective projection light-absent region) where the projection light projected from the projectors onto the screens is not hindered, and the prohibiting space (i.e., the effective projection light-present region) where the projection light is hindered.

FIG. 17B shows the case where four unit reinforcing sheets are stacked together, and reference numeral 220 denotes the reinforcing sheet, and reference numeral 241 denotes the hole formed in the side wall of the reinforcing sheet. A shaded part 255 represents the prohibiting space on the vertical cross-sectional plane of the screen. A shaded part 256 represents the prohibiting space on the horizontal cross-sectional plane of the screen.

When an object which intercepts the light exists in the prohibiting space, a harmful shadow is produced on the screen. Namely, the prohibiting space is the region where the effective projection light is present. The free space is the remainder except for the prohibiting spaces. The holes 241 are provided in the free space. Therefore, the holes 241 do not produce any harmful shadow.

In accordance with a change in the ambient temperature and humidity, the horizontally-adjacent reinforcing sheets 220 can be expanded and contracted in the right and left directions in intimately contacted relation to each other. Therefore, the vertical stripe-like gap can be minimized.

Figure 18:
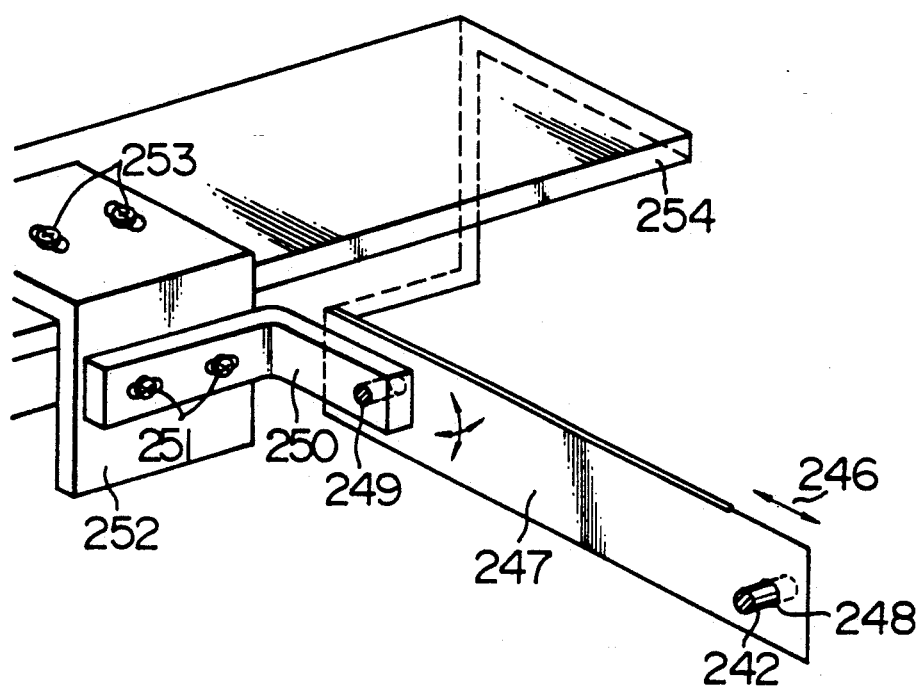
FIG. 18 is a perspective view of an important portion of the second embodiment of FIG. 16.

FIG. 18 is a perspective view of an important portion of the second embodiment of the invention. The purpose of this portion is to impart an earthquake resistance to the screen.

In FIG. 18, reference numeral 242 denotes a pin identical to the pin 242 of FIG. 16, and the pin 242 is inserted in the pin insertion hole 241 (FIG. 16) formed in the side wall of the reinforcing sheet 220. Reference numeral 247 denotes a metal plate for limiting the displacement of the sheet in the z-direction. Reference numeral 249 denotes a pin, reference numeral 250 a first L-shaped metal member, reference numerals 251 and 253 screws, reference numeral 252 a second L-shaped metal member, and reference numeral 254 a beam serving as a fixing member.

Referring to FIGS. 16 and 18, the pin 242 is passed through a hole 248 formed through one end of the metal plate 247. The pin 242 is inserted in the hole 241 formed in the side wall of the reinforcing sheet 220. Therefore, the metal sheet 247 is interposed between the elongated reinforcing sheets 220 and 220 disposed adjacent to each other. The other end of the metal plate 247 is connected to the beam (fixing member) 254 through the pin 249, the first L-shaped metal member 250, the screws 251, the second L-shaped metal member 252 and the screws 253. The metal plate 247 is disposed between the reinforcing sheet 220 and the beam (fixing member) 254, and fixes the reinforcing sheet 220 relative to the beam 254 in the z-direction. Namely, the metal plate 247 serves as the forward-backward absolute displacement-limiting means which limits the absolute displacement of the screen (the reinforcing sheet 220) in the forward and backward directions (i.e., the z-direction).

More specifically, the metal plate 247 has a thickness of about 1 mm and a length of about 780 mm (the width thereof will be described later). The metal plate 247 ca be made of stainless steel or iron. The hole 248 is formed through one end of the metal plate 247. The pin 242 is passed through the hole 248. Therefore, the one end of the metal plate 247 in its mounted condition is sandwiched between the right and left reinforcing sheets 220. The other end of the z-direction limiting metal plate 247 is connected to the first L-shaped metal member 250 by the pin 249. In this embodiment, the thickness of the first L-shaped metal member 250 is about 5 mm. Reference numerals 251 and 253 denotes the screws. Reference numeral 252 denotes the second L-shaped metal member. The first L-shaped metal member 250 is connected to the second L-shaped metal member 252 by the screws 251. Reference numeral 254 denotes the L-shaped beam. The second L-shaped member 252 is fixed to the beam 254 by the screws 253. The beam 254 is fixed, as forward-backward displacement-limiting means 127, to a pillar member 128 shown in FIG. 32. The pillar member 128 exists in the free space 257 on the horizontal cross-sectional plane of FIG. 17A.

The description of the construction of FIG. 18 has now been finished, and the operation thereof will now be described. As described above, each of the sheets constituting the screen is made of a transparent plastics material, and therefore is expanded or contracted in accordance with a change in the ambient temperature and humidity. Therefore, the z-direction displacement-limiting mechanism must be free at least in the direction of the height (i.e., the y-direction).

In FIG. 18, the diameter of the pin 242 is about 3 mm whereas the diameter of the hole 248 is about 3.5 mm. Therefore, the pin 242 can be rotated freely. The pin 249 can also be rotated freely. Therefore, the mechanism of FIG. 18 does not limit the displacement of the pin 242 in the direction of the height. A slight displacement of the pin 249 in the horizontal direction (i.e., the x-direction) is allowed.

On the other hand, it is clear that the displacement in the z-direction (i.e., the forward-backward direction) is limited by the mechanism of FIG. 18. The displacement of the peripheral edge of the overall screen (the reinforcing sheets) in the z-direction is limited by a separate frame means.

In connection with the z-direction displacement, the earthquake resistance will now be described in detail. According to the records of the historically large earthquakes in the world, the maximum acceleration in a horizontal plane is about 0.5 times the gravitational acceleration G, and the vibration spectrum is about 0.5 Hz to about 5 Hz. Therefore, it is preferred that the construction be designed to withstand the acceleration of 1G and to have a resonance frequency of about 5Hz or more.

The important element in FIG. 18 is the z-direction displacement-limiting metal plate 247. The requirements for the metal plate 247 not to be subjected to buckling at the acceleration of 1G will be described in the following.

As mentioned above, the pin 242 is provided at the joint between any two adjacent unit screens (see FIG. 16). Although not shown in the drawings, holes may be formed respectively in the upper and lower edges of the Fresnel sheet 211, and pins may be inserted into these holes, respectively. In the case where an enormous multi-screen is constituted by a large number of unit screens, the number of the pins 242 is almost equal to the number of the unit screens.

Based on the above-mentioned numerical values, the mass per unit screen is about 20 kg. Therefore, the acceleration of 1G corresponds to a force of 20 kgG.

According to Euler's equation of buckling, the following equation must be satisfied:

$$\{F/(EI)\}^{\frac{1}{2}} \leq (\pi/l) \tag{1}$$

where the following is defined:
F = 20 kgG
E ≈ 20000 kgG/(mm)² (Young's modulus)
I = (bt³)/12 (second moment of area)
t = 1 mm (thickness)
l = 180 mm (length)
b: width The width b of the metal plate 247 is calculated from the above equation as follows:

$$b \geq \{12F/(ET^3)\} \cdot (l^2/\pi^2) \approx 40 \text{ mm}$$

Namely, the width of the z-direction displacement-limiting metal plate 247 is set to not less than 40 mm. Incidentally, the major proportion of the metal plate 247 except for its portion in the vicinity of the hole 248 may be formed into a L-shaped cross-section so as to increase the buckling strength. Also, the end portion of the metal plate 247, which has the hole 248 and is sandwiched between the reinforcing sheets 220, can be reduced to a thickness half the thickness of the remainder over a length (indicated by two-head arrow 248) of about 12 mm (see FIG. 18). The reason for this is that the buckling resistance can be enhanced by the sandwiching pressure. By doing so, the gap between the reinforcing sheets 220 can be decreased. Therefore, the discontinuous width of the vertical stripe-like default band (joint) between the sheets can be minimized.

With the construction of FIG. 18 limiting the z-direction displacement, the resonance mode of the screen (220, 211, 212) of FIG. 16 is close to the resonance mode of the beam 254 supporting the right and left edges of the reinforcing sheets 220. According to the strength of materials, the resonance frequency of of the reinforcing sheet 220 is expressed by the following equation (Since the thicknesses of the Fresnel sheet 211 and the front sheet 212 is small, the mass of these is ignored here):

$$of \approx \{(\pi t)/(4a^2)\} \cdot \{E/(3\rho)\}^{\frac{1}{2}} \tag{2}$$

where the following is defined:
t ≈ 12 mm (thickness)
a ≈ 1000 mm (width)
E ≈ 300 kgG/(mm)² (Young's modulus)
ρ ≈ 1.2 g/(cm)³

Therefore, the design requirements are satisfied in the above example.

The explanation of the earthquake resistance in the forward and backward direction of the screen (i.e., the z-direction) has now been finished Next, the earthquake resistance in the right and left direction (i.e., the x-direction) will now be described Assuming the reinforcing sheet as a pendulum, its resonance frequency is not more than 0.5 Hz since its length is not less than about 1.5 m. This is smaller than the earthquake spectrum, and therefore the screen can be regarded as a simple inertia body with respect to the x-direction.

When the acceleration of 1G is applied to the screen in the x-direction, a horizontal shearing stress Fs is applied to the horizontal cross-section of the reinforcing sheet 220 of FIG. 16. This can be expressed by the following equation:

$$Fs = \alpha \cdot \rho \cdot y \tag{3}$$

where the following is defined:
α = 1G (acceleration)
ρ = 1.2 g/(cm)³
y = height (measured from the lower end)

According to Mohr's theory of stress circle, when the horizontal shearing stress exists, a conjugate shearing stress of the same value also exists in the vertical direction. In FIG. 16, this vertical shearing stress need to be transmitted from the pin 242. Therefore, the shearing force Fl which need to be borne by each pin 242 is expressed by the following equation (The connecting metal plates 245, interconnecting the upper ends of the sheets as well as the lower ends, cooperate with the pins 242):

$$Fl \approx Fs \cdot H \cdot t = \alpha \cdot \rho \cdot y \cdot H \cdot t \tag{4}$$

where the following is defined:
H = 750 mm (height of unit screen)
t = 12 mm (thickness)
α·ρ·y (see equation (3))

$$\therefore Fl \approx (10.8 G/mm) y \tag{5}$$

Therefore, if the maximum value of the height of the screen is, for example, about 3 m (in the case of 4-stage stack type), the value of Fl is expressed as follows:

$$Flmax \approx 10.8G \times 3000 \approx 32 \text{ kgG} \tag{6}$$

Therefore, in accordance with the number of the vertically-stacked stages, the material for the pin 242, its diameter and the thickness of the reinforcing sheet 220 are so selected that the construction can withstand the shearing force. In the case of the very enormous screen having a large number of stack stages, it is effective that the opposed side walls of the adjacent reinforcing sheets 220 be bonded together at least partially. The description of the second embodiment has now been finished.

Next, a third embodiment of the invention will now be described. This embodiment is intended to apparently decrease the discontinuity of the image on the boundary band between unit Fresnel sheets. The third embodiment skillfully utilizes the physic of the visual sense (of the human eyes) discovered by the inventor of the present invention. Therefore, the physic of the visual sense will now be described with reference to FIG. 19.

Figure 19:
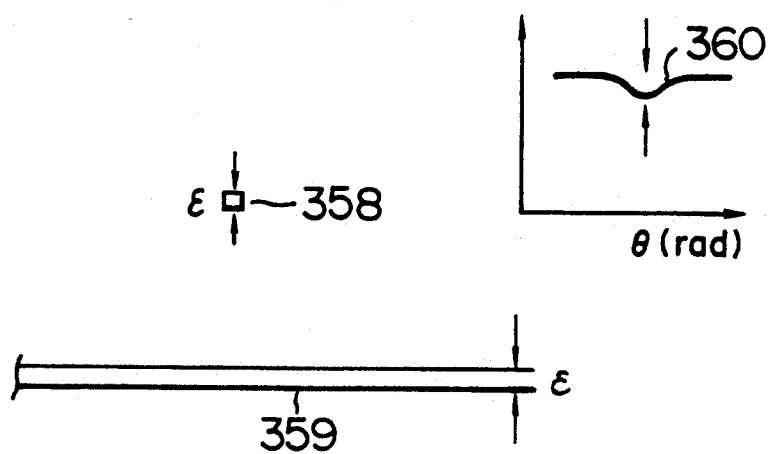
FIG. 19 is a view explanatory of the physic of the visual sense discovered by the inventor of the present invention.

In FIG. 19, reference numeral 358 denotes a black dot representing a shadow of a square shape each of which sides has a width 8, and reference numeral 359 denotes a black line representing a long shadow having a width ε. When observing them at a position close to them, both can be recognized easily. However, when the visual distance D is increased, it is first difficult to recognize or identify the existence of the block dot 358. In the case of a person having the average eyesight, a threshold of the minimum recognizing angle is about one minute, that is, about 0.3 mrad. Therefore, when the value of ε is about 1 mm, the limit distance of the detection is about 3.3 m. At this time, it is thought that a valley of about 1.6 to 5% is produced in the illumination profile (corresponding to the black dot 358) on the retina. Reference numeral 360 in FIG. 19 represents such a valley. The abscissa axis $\theta$ represents the visual angle.

As the visual distance D is further increased, it becomes difficult to recognize the existence of the black line 359. A threshold of its minimum recognizing angle is about 0.03 mrad according to several experiments made by the inventor. Namely, the visual distance of about 33 m corresponds to the line whose width is 1 mm.

It is thought that the above dot/line difference is attributable to one-dimensional/two-dimensional response difference in the illumination profile on the retina. Broadly speaking, this can be understood in the following. Assuming that at the visual angle of 0.03 mrad, the line recognizing threshold corresponds to the valley which is about 1.6% (the detection limit of the known area brightness difference) of the illumination profile on the retina, the depth of the valley of the line image at the visual angle of 0.3 mrad (about ten times larger than the above visual angle) is presumably about 16% (about ten times larger than the above) according to two-dimensional Fourier analysis. In the case of the dot image at the visual angle $(0.3 \text{ mrad})^2$, the image further spreads unclear in the horizontal direction, and as a result it is thought that the depth is $(16\%)^2$, that is, about 2.6%, according to two-dimensional Fourier analysis. It is understood that this is the threshold for the dot-like (two-dimensional small visual angle) object.

The study of the dot/line response difference has now been finished, and next assuming that the depth of the valley for the line response of 0.3 mrad is decided to be 16% as described above and that the normal profile is present, the frequency characteristics G(f) of the eye will now be determined. According to Fourier's theory, the following is given:

$$G(f) = (1/\theta o) \cdot exp\ [(-\pi\theta^2)/\theta^2] \cdot exp\ (j2\pi f\theta) dt \quad (7)$$

where $\theta$ represents the visual angle, and $\theta o$ represents the constant which should be called "effective spreading angle of the line image". According to the above condition in which 16% is obtained at 0.3 mrad, the value of $\theta o$ is obtained from the following equation:

$$\theta o \approx (0.3/0.16) \text{mrad} \approx 1.9 \text{ mrad} \quad (8)$$

From the above equations (7) and (8), the following equation is obtained according to an integrating formula:

$$G(f) = exp(-\pi\theta o^2 f^2) \approx exp-(3.3 \text{ mrad } f)^2 \quad (9)$$

Figure 21:
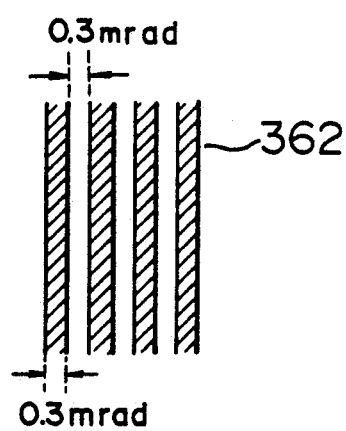
FIG. 21 shows alternate white and black pattern and its frequency response characteristics.
Figure 21:
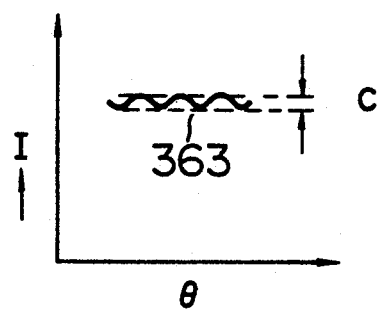

Therefore, when viewing a pattern of alternate white and black lines as designated at 362 in FIG. 21, the frequency response is expressed by the following equation, because the value of f is one cycle/0.6 mrad:

$$G(1/0.6 \text{ mrad}) = exp(-5.5^2) \approx 7.3 \times 10^{-14} \quad (10)$$

The pattern in FIG. 21 has a rectangular wavy or corrugated configuration, and in view of the Fourier coefficient of $4/\pi$ and also in view of the peak-to-peak coefficient (two times) designated at C in FIG. 21, the following is given:

$$C = 2(4/\pi)G \approx 1.9 \times 10^{-13} \quad (11)$$

Namely, the ripple of the illumination on the retina is very small, and therefore can not be recognized.

In contrast, in order that the number of the lines of the alternate pattern can be recognized, it is assumed that the value of C need to be not less than 1.6% (0.016), and the spatial frequency value fo corresponding to it is obtained from the above equations (9) and (11) as follows:

$$G(f) = exp-(3.3 \text{ mrad } fo)^2 = 0.016\pi/8 \approx 6.3 \times 10^{-3} \quad (12)$$

$$fo \approx (1 \text{ cycle})/(1.46 \text{ mrad}) \quad (13)$$

Namely, with respect to the recognizing threshold for the alternate pattern, the frequency is 1.46 mrad (that is, the width of the black is 0.73 mrad). From the above results, the following Table is obtained:

TABLE 1

| Shape | Shape dependency of threshold | |
|---|---|---|
| | Threshold visual angle (relative ratio) | Illumination difference |
| Black dot (square shape) | 0.3 mrad (1) | 2.6% |
| One black line | 0.03 mrad (0.1) | 1.6% |
| Alternate pattern | 0.73 mrad/half cycle (2.4) | 1.6% |

As will be appreciated from the above, in view of the nature of the visual sense, it is considered to be relatively difficult to recognize the number of the lines of the alternate pattern. The data in the lowermost row of the above Table 1 belong to a deductive discovery made by the inventor of the present invention. When consideration is made, applying this nature to the boundary band between the screens, it is thought that if the discontinuous width of the boundary band is not more than about 1.46 mrad, and also if the brightness at this portion is almost equal to the brightness of the ambient display screen, the discontinuity can not be visually recognized. In other words, even if the black line whose width is 0.3 mrad exists at the boundary band, this black line is made less conspicuous by applying a bright line, which is more bright than the ambient display screen, to the region within 1.46 mrad from the above black line so as to bring the average brightness of the bright line and the black line close to the brightness of the ambient display screen.

The basic principles of the third embodiment of the invention has now been finished.

Figure 22:
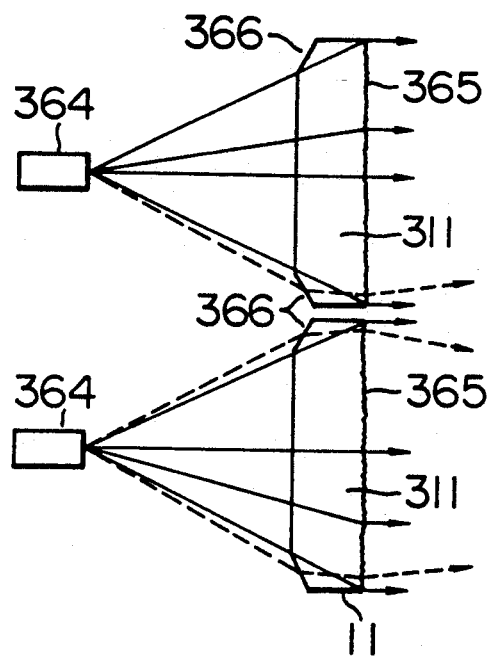
FIG. 22 is a side-elevational view of a third embodiment of the invention, showing the structure of upper and lower ends of unit Fresnel sheets.

Next, the construction of the upper and lower ends of a unit Fresnel sheet, which is an important feature of the third embodiment, will now be described with reference to FIG. 22. FIG. 22 is a vertical cross-sectional view. A reinforcing sheet and a front sheet are omitted for the sake of simplicity of the illustration.

In FIG. 22, reference numeral 311 denotes the Fresnel sheet, and reference numeral 365 denotes a Fresnel lens surface. Reference numeral 364 denotes a projection light source, and solid-line arrows represent ordinary light rays, and dot-line arrows represent urging light rays. Reference numeral 366 denotes a light-urging lens portion on the upper (lower) end of the unit Fresnel sheet, the light-urging lens portion 366 constituting an important portion of the invention.

In the prior art in which the portion corresponding to the overscan light-urging deflection prism (or lens) 366 has a flat shape, the light rays represented by the dot-line arrows was lost a light losses at the boundary band between the sheets. A black paint is coated on the side surface of the Fresnel sheet 311, and the light is absorbed by the black paint. In the present invention, thanks to the light-urging prisms (or lens) 366 formed on the incident surface of the unit Fresnel sheet 311 at the upper and lower ends thereof, the light rays which have heretofore been the light losses can be effectively used as outgoing light rays as indicated by the dot-line arrows.

Figure 23:
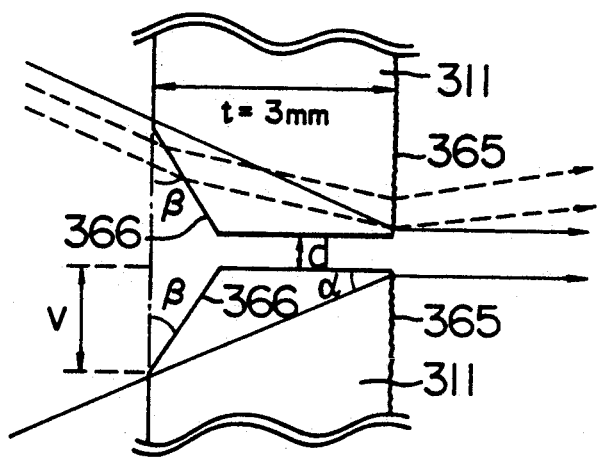
FIG. 23 is an enlarged view of the default band (boundary band) between the unit Fresnel sheets of FIG. 22.

The boundary band between the unit Fresnel sheets 311 and 311 is shown in FIG. 23 on an enlarged scale. The vertical picture angle $\alpha$ in the Fresnel medium is about 0.2 rad. Therefore, the width v of the light-urging lens portion in FIG. 23 is 0.2t$\doteq$0.6 mm. On the other hand, the gap d at the boundary band is about 0.3 mm. It will suffice that the light is urged by an amount of about 0.15 mm per Fresnel sheet. To achieve this, the necessary refraction angle of the light-urging lens 366 is 0.15 mm/3 mm, that is, about 0.05 rad. The refractive index n of the Fresnel medium is about 1.5, and therefore the prism angle $\beta$ is expressed according to Snell's law as follows:

$$\beta = 0.05\ rad \times n/(n-1) = 0.15\ rad$$

Reference is now made to the advantageous effects of the embodiment having the construction of FIGS. 22 and 23. If the width (gap) d of the boundary band is 0.3 mm, and when the boundary band is observed from a visual distance of about 1 m or more, the light-lost band and the light-urging band disposed adjacent thereto are fused together, so that the boundary band becomes inconspicuous. In the prior art, the boundary band has been detected from within the visual distance of 10 m. Therefore, from a theoretical point of view, the limit can be improved ten times better. The description of the third embodiment of the invention has now been finished.

Figure 24:
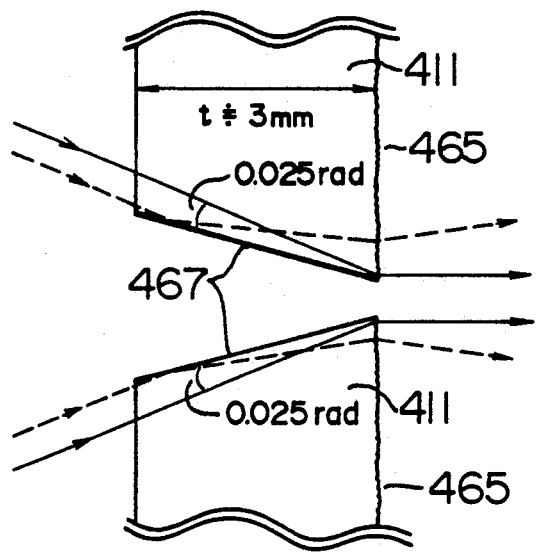
FIG. 24 is a view similar to FIG. 23, but showing a fourth embodiment of the invention.

FIG. 24 shows a fourth embodiment of the invention. FIG. 24, like FIG. 23, is an enlarged view of an important portion. In FIG. 23, the light-urging lenses 366 are used while in FIG. 24, total reflection mirrors 467 are used. The angle between the ordinary light ray (indicated by a solid line) and the mirror portion 467 is set to a half of the above necessary refraction angle 0.05 rad. The description of the fourth embodiment has now been finished.

Figure 25:
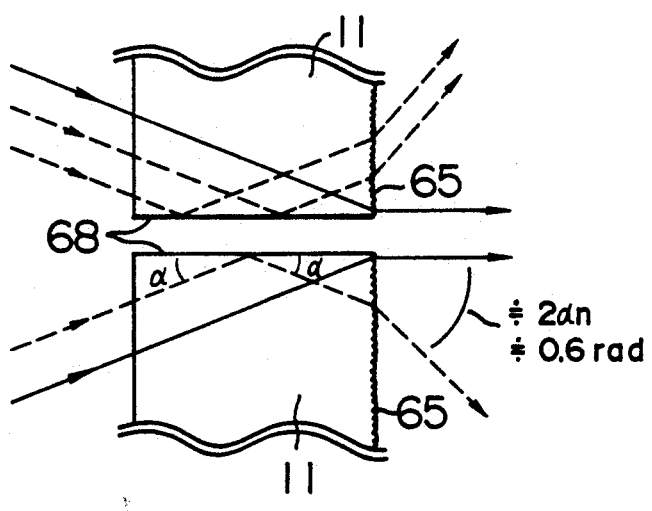
FIG. 25 is a view similar to FIGS. 23 and 24, but showing the prior art.

Next, a fifth embodiment of the invention will now be described, but before doing so, problems of the prior art will first be supplementally described with reference to FIG. 25. FIG. 25, like FIGS. 23 and 24, is a cross-sectional view showing upper and lower end portions of Fresnel sheets 11. In FIG. 25, a blackening paint is not applied to the upper and lower side surfaces 68 of the Fresnel sheets. Non-effective light rays represented by dot-line arrows are totally reflected by the side surface 68, so that each of these light rays is emitted from the light-outgoing surface of the Fresnel at a very large angle $\gamma$, as shown in FIG. 25. As mentioned above, when the picture angle $\alpha$ at the upper and lower ends of in the Fresnel medium is 0.2 rad, the value of $\gamma$ becomes as large as about 0.6 rad. Therefore, when observing the boundary band between the screens from the front side of the screen, it can be seen as the harmful black line. In addition, when observing the boundary band between the screens in the upward-downward direction (i.e., in the direction of the specific angle $\gamma$), the boundary band constitutes a harmful white bright line-like hindrance. When the side surface 68 is coated with the black paint, the white bright line hindrance is eliminated, but the black line hindrance remains.

Figure 26:
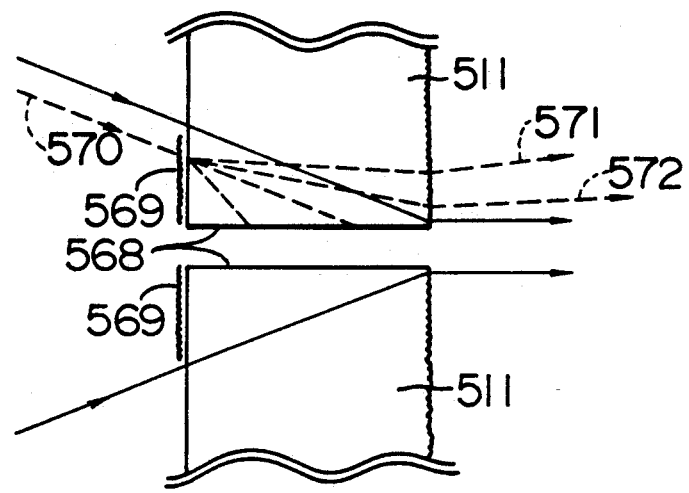
FIG. 26 is an enlarged view of a default band between unit Fresnel sheets, showing a fifth embodiment of the invention.

FIG. 26 shows the fifth embodiment of the invention for overcoming the above problems. In FIG. 26, reference numeral 569 denotes a striped light diffuser sheet for urging the light. This light diffuser sheet 569 is bonded to a non-effective light incident portion (i.e., an overscan light incident portion) of an incident surface of a Fresnel sheet 511. The light diffuser sheet 569 has a width of about 0.6 mm and a thickness of about 0.3 mm or less. A black paint is applied to a side surface 568. In FIG. 26, at least part of the overscan incident light 570 indicated by a dot line are refracted in desired directions, and are emitted as outgoing light rays 571 and 572. These light-urging light rays serve to relieve a black line-like hindrance at the boundary band. Part of the overscan incident light indicated by the dot line is refracted in an undesired direction, but is absorbed by the black side surface 568.

Figure 27:
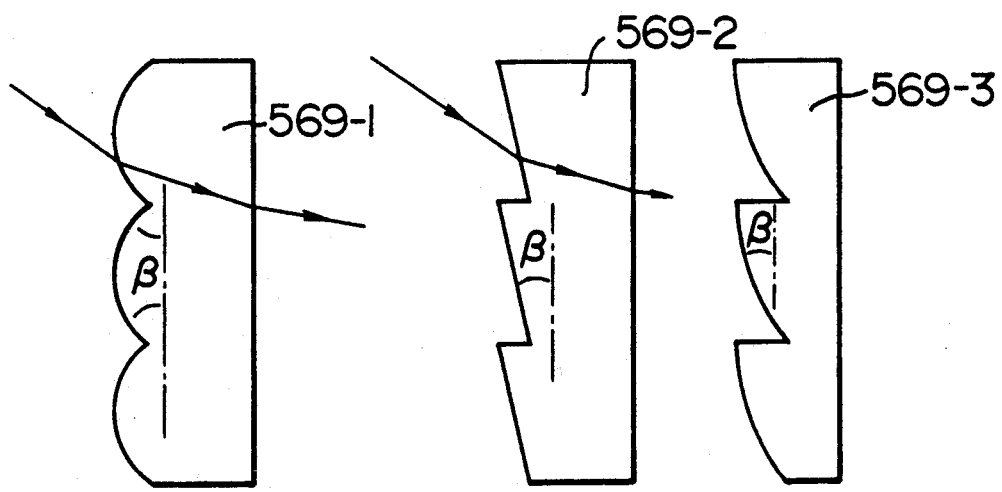
FIG. 27 shows cross-sectional views of examples of light urging sheets used in the embodiment of FIG. 26.

FIG. 27 shows examples of shapes of the light-urging sheet 569 used in the embodiment of FIG. 26. In FIG. 27, reference numeral 569-1 denotes a stripe-like lenticular sheet, reference numeral 569-2 denotes a stripe-like prism sheet, and reference numeral 569-3 denotes a stripe-like prism/lenticular sheet. Vertical cross-sections of these sheets are shown in FIG. 27. An angle $\beta$ in FIG. 27 is the same as the angle $\beta$ mentioned in FIG. 23. The description of FIG. 27 has now been finished.

Figure 1:
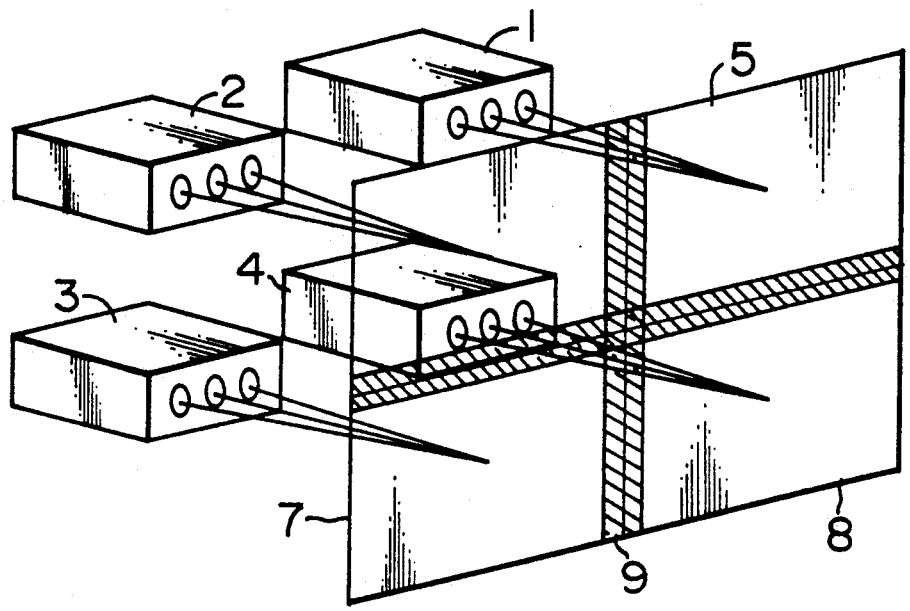
FIG. 1 is a perspective view of a general construction of a multi-screen projector.
Figure 2:
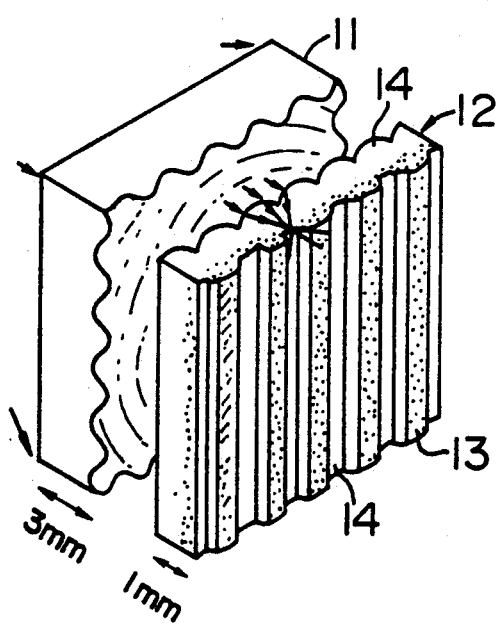
FIG. 2 is a perspective view of a specific example of unit screen.
Figure 3:
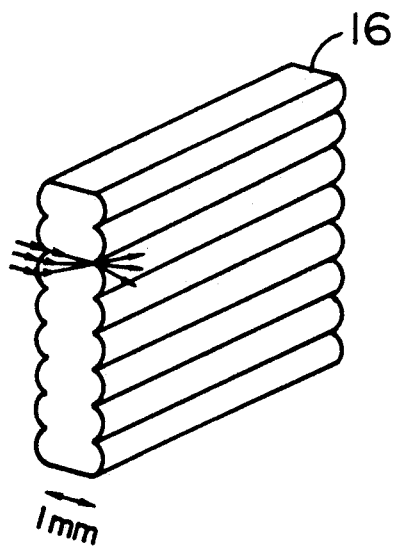
FIG. 3 is a perspective view of a lenticular sheet.
Figure 6:
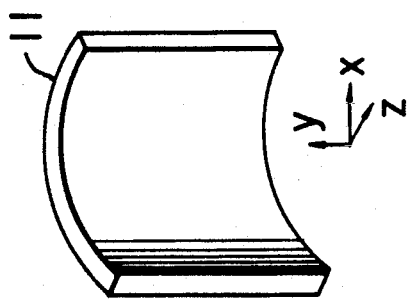
FIG. 6 is a perspective view of a Fresnel sheet in a warped condition.

FIG. 28 shows a sixth embodiment of the invention. In FIG. 28, reference numeral 611 denote linear Fresnel sheet, and a Fresnel lens surface 673 is formed on its light-outgoing surface. A basic method of constructing a unit screen using the linear Fresnel lens is described in U.S. Pat. No. 4,536,056 mentioned above in connection with the description of FIG. 2.

The ordinary circular Fresnel lens 11 functions to refract light in a two-dimensional manner (i.e., in horizontal and vertical directions) whereas the linear Fresnel lens serves to refract light in a one-dimensional manner (in this embodiment, only in the vertical direction). The important portion of FIG. 28 is a light-urging prism portion (side surface prism) 674 provided on each of the upper and lower ends of the linear Fresnel lens sheet 611.

If the side surface prism 674 does not exist, the limit of the effective light is a light ray 675. However, if the side surface prism 674 exists, the limit of the effect light is a light ray 676. Namely, in FIG. 28, the overscan light at the region indicated by a width W are converted into effective light by the action of the light-urging prism 674. Therefore, a black line hindrance is relieved, and also the overscan information is recovered. The size of the width W is set to about a half (0.15 mm) of the gap d (whose average value is 0.3 mm). The description of the sixth embodiment has now been finished.

Each of the above third, fourth, fifth and sixth embodiments has been described for relieving the black line hindrance at the boundary band between the upper and lower unit Fresnel sheets. This concept can also be applied for relieving the black line hindrance at the boundary band between the right and left unit Fresnel sheets. In this case, the above-mentioned light-urging means is applied to the right and left ends of the Fresnel sheet.

However, usually, the width of the boundary band between the right and left ends is large, for example, on the order of about 1.5 mm. This value is about five times greater than the gap (0.3 mm) between the upper and lower ends. Therefore, five times greater light-urging is needed. In view of this, it is effective to provide the light-urging means, mentioned in the third and fifth embodiments, on the right and left ends of the reinforcing sheets 620 at the incident surface thereof. As described above, the thickness of the Fresnel sheet is about 3 mm, and the thickness of the reinforcing sheet is about 12 mm. Therefore, the width of the overscan light incident portion in FIG. 23 is about 0.6 mm at the incident side of the Fresnel sheet as described above whereas it is five time greater (i.e., about 3 mm) at the incident side of the reinforcement sheet. Therefore, such five time greater light-urging can be achieved.

FIGS. 29A, 29B and 29C show seventh to ninth embodiments of the invention, respectively. Each of these Figures shows a horizontal cross-section of a reinforcing sheet 720. An overscan light-urging deflection prism 777 corresponds to the prism (or lens) 366 in FIG. 23, and an overscan light-urging deflection mirror 778 corresponds to the mirror 467 in FIG. 24, and an overscan light-urging deflection element 779 corresponds to the diffuser sheet 569 in FIG. 26. The operations of these overscan light-urging deflection means are the same as the above-mentioned means, and therefore explanation thereof is omitted.

The description of the embodiments for relieving the black line hindrance have now been finished.

Next, modified forms of the invention will now be described. Of course, the support body 24 may be connected to the reinforcing sheet 20 in which case the upper and lower ends of the reinforcing sheet are used as an interface. However, this may be modified as shown in FIG. 30.

Figure 30:
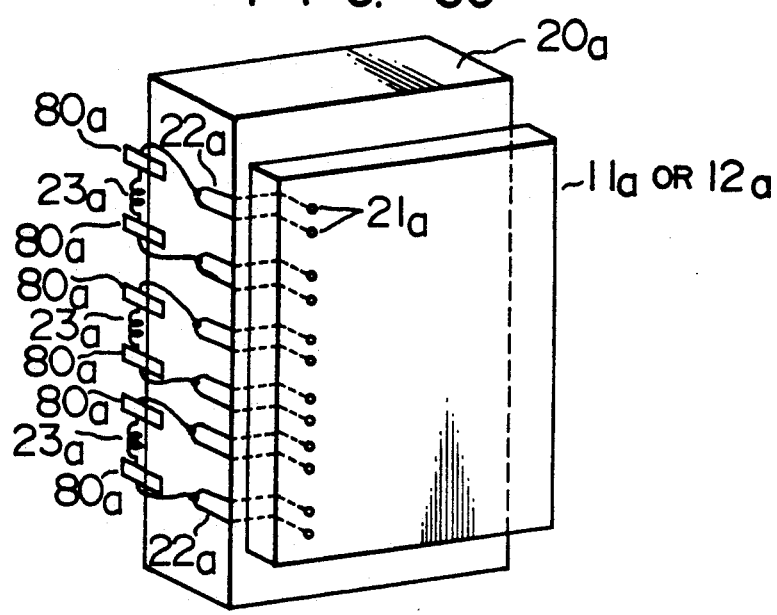
FIG. 30 is a perspective view of an important portion of a tenth embodiment of the invention.

FIG. 30 shows an important portion of a tenth embodiment of the invention. In FIG. 30, reference numeral 20a denotes a reinforcing sheet, reference numeral 11a denotes a Fresnel sheet, and reference numeral 12a denotes a front sheet. Reference numeral 21a denotes a narrow hole, reference numeral 22a denotes a wire, and reference numeral 23a denotes a coil spring. Reference numeral 80a denotes a support member or body which has a thickness of about 0.8 mm, a width of about 10 mm and a length of about 10 mm. The support member 80a is made of metal or a plastics material. The support members 80a are fixedly secured to the side surface of the reinforcing sheet 20a by an adhesive or screws. In FIG. 30, each wire 22a is passed past the support member 80a and is connected to the coil spring 23a. Although only the left side of the reinforcing sheet 20a is shown in FIG. 30, the same means is, of course, provided on the right side.

A free space (see FIG. 9) of about 3 mm exists at each of the right and left ends of the reinforcing sheet 20 at the incident side thereof. The coil springs 23a are disposed at the free space. In this construction, the number of the required coil springs is half of that required in the embodiment of FIG. 5.

As described above, the free spaces of 0.6 mm exist respectively at the right and left ends of the Fresnel sheet at the incident side thereof (Therefore, the sum of these free spaces is 1.2 mm). Therefore, the above thickness (0.8 mm) of the support member 80a sandwiched between the reinforcement sheets is allowed. The description of the tenth embodiment has now been finished.

Figure 31:
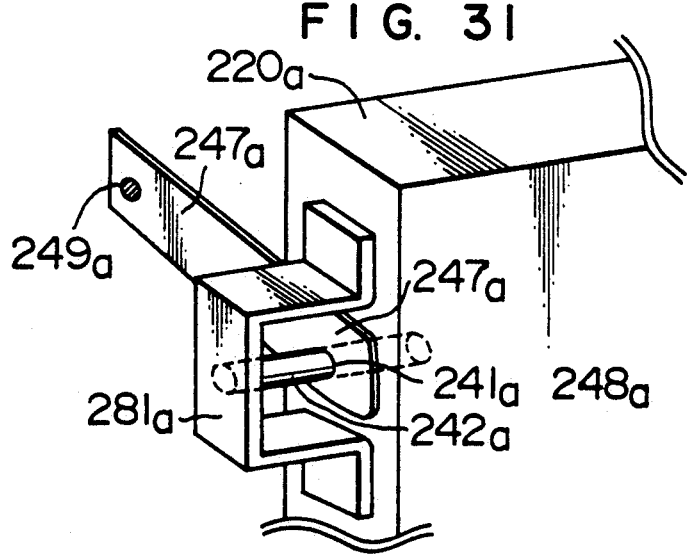
FIG. 31 is a perspective view of an important portion of an eleventh embodiment of the invention.

A special treatment applied to the right and left ends of the overall multi-screen in the second embodiment described above with reference to FIG. 18 will now be described as an eleventh embodiment with reference to FIG. 31. FIG. 31 shows only an important portion, and means is provided for preventing the pin 242 of FIG. 16 from being disengaged from the hole 241 or the hole 248 (FIG. 18). In FIG. 31, reference numeral 220a denotes a reinforcing sheet disposed at the left end of the overall screen. Reference numeral 247a denotes a metal plate already mentioned in FIG. 18, and reference numeral 249a denotes a pin already mentioned in FIG. 18. The pin 249a is connected to the L-shaped metal member 250. Reference numeral 242a denotes a pin, and reference numeral 248a denotes a hole formed through the metal plate 247a, and reference numeral 241a denotes a hole formed in the side surface of the reinforcing sheet 220a. Reference numeral 281a denotes a holder metal member which constitutes an important portion of this embodiment. The holder metal member 281a is fixedly secured to the reinforcing sheet 220a by an adhesive or screws. The pin 242a is prevented by the holder metal member 281 from disengagement. In FIG. 31, one holder metal member 281a is provided per pin 242a. In an alternative example, there may be used a single elongated holder metal member adapted to be fixed only to the upper and lower ends of the reinforcing sheet 220a by the screws 246 (FIG. 16).

A modified form of the combination of the metal plate 247 and the pin 248 (FIG. 18) in the second embodiment will now be described as a twelfth embodiment with reference to FIG. 32.

Figure 32:
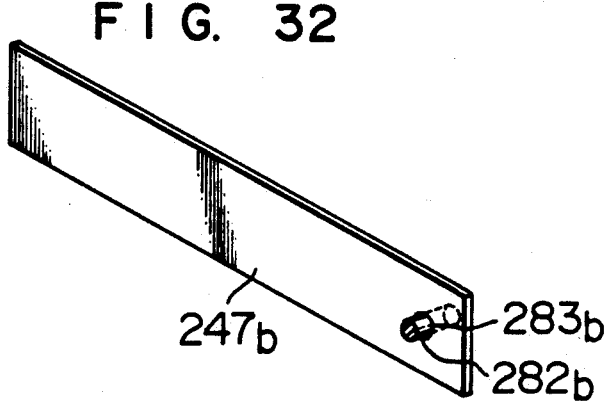
FIG. 32 is a perspective view of a metal plate, showing a twelfth embodiment of the invention.

In FIG. 32, reference numeral 247b denotes a z-direction displacement-limiting metal plate, and reference numeral 282b denotes a pin having a length (about 16 mm) half of that of the pin 242 of FIG. 18. The diameter of the pin 282b is about 3 mm. The pin 282b is welded at its one end 283b to the metal plate 247b having no hole.

The pin 282b shown in FIG. 32 is inserted into the hole 241 of FIG. 16, thereby limiting the z-direction displacement. However, in this case, the metal plates 247b for the right side and the left side are used independently of each other. Therefore, the connecting metal members 245 (FIG. 16) on the upper and lower ends of the reinforcing sheet are omitted. In the explanation of the earthquake resistance of the second embodiment, it has been mentioned that the vertical shearing force is applied to the pin 242. In the twelfth embodiment, the reinforcing sheets can be inclined right and left independently of each other. Therefore, the shearing force is not exerted on the pin 282b. Therefore, the pin 282b need only to withstand the load in the z-direction (i.e., in the direction perpendicular to the plane of the screen). The acceleration in the z-direction at the time of an earthquake is about 0.5 G, and the force corresponding to this is small (i.e., about 10 kgG per screen). Therefore, the strength of the welded portion at the proximal end 283b of the pin 282b can sufficiently withstand such force.

As will be appreciated from the above description, the twelfth embodiment is a quite effective means for achieving the enormous screen of more than six-stage stack construction like a ultra multi-story building. In the twelfth embodiment of FIG. 32, since the force applied to the pin 282b is small as mentioned above, the holes 241 may not be formed in the side surface of the reinforcing sheet 220, and instead the side surface bonding technique of FIG. 16 or the like may be used. This is shown in FIG. 33 as a thirteenth embodiment of the invention.

Figure 33:
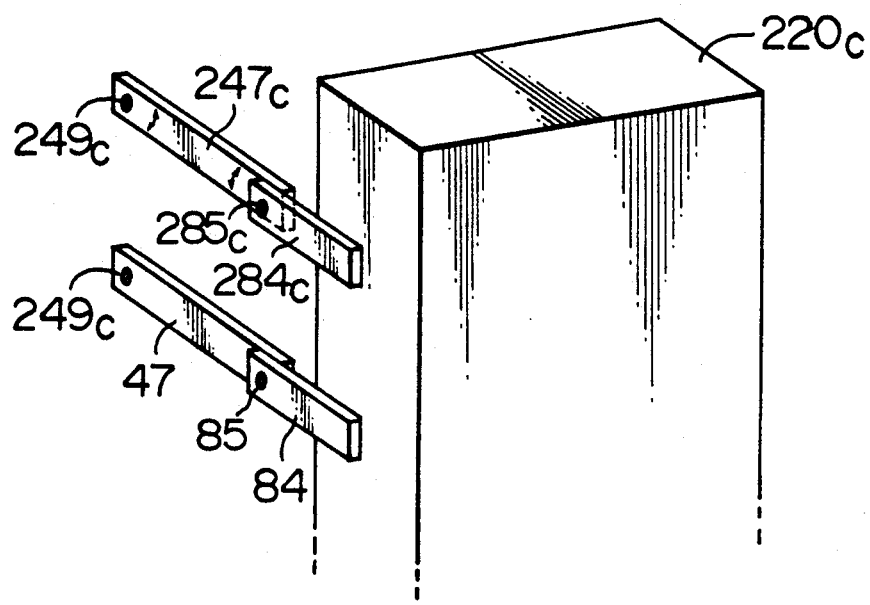
FIG. 33 is a perspective view of an important portion of a thirteenth embodiment of the invention.

In FIG. 33, reference numeral 247c denotes a z-direction displacement-limiting metal plate which is connected to a first L-shaped metal member through a pin 249c as in FIG. 18. Important portions of FIG. 33 are a metal plate (connecting member) 284c and a pin 285c. The metal plate 284c is fixedly secured to the side surface of the reinforcing sheet by an adhesive or a screw. Thanks to the action of the pins 249c and 285c, even when the reinforcing sheet 220 is expanded or contracted due to a change in temperature and humidity, any excessive stress is not exerted on the fixed portion of the metal plate 284c. The description of the thirteenth embodiment has now been finished.

In each of the embodiments of the invention, the light-outgoing surface of the reinforcing sheet and the light-incident surface of the Fresnel sheet may be optically integrally formed with each other. To achieve such integral formation, the reinforcing sheet and the Fresnel sheet may be adhesively bonded together, or the Fresnel lens surface may be formed directly on the light-outgoing surface of the reinforcing sheet. The thickness of the unit Fresnel sheet may be increased, and holes may be formed in the opposed upper and lower side surfaces of any two vertically adjacent Fresnel sheets, in which case the Fresnel sheets are connected together by vertical pins.

The projection light source portion used in the present invention may be a CRT projector using three ordinary CRTs and three ordinary lens, or may be a single lens-type projector using a liquid crystal panel.

Finally, the effects of the buckling resistance-increasing strength achieved by the z-direction (forward-backward direction) absolute displacement-limiting means mentioned in the second embodiment (FIG. 18) will be supplementally described.

This will be described with reference to FIG. 34 which is a horizontal cross-sectional view of four columns of reinforcing sheets 220. Reference numeral 288 denotes the z-direction displacement-limiting means (the z-direction displacement-limiting metal plate 247a) for the right and left side surfaces of the overall screen, which has been mentioned in FIG. 31. Reference numeral 289 denotes the z-direction displacement-limiting means (the z-direction displacement-limiting metal plate 247a) for the joint between the unit sheets, which has been mentioned in FIG. 18.

Figure 34:
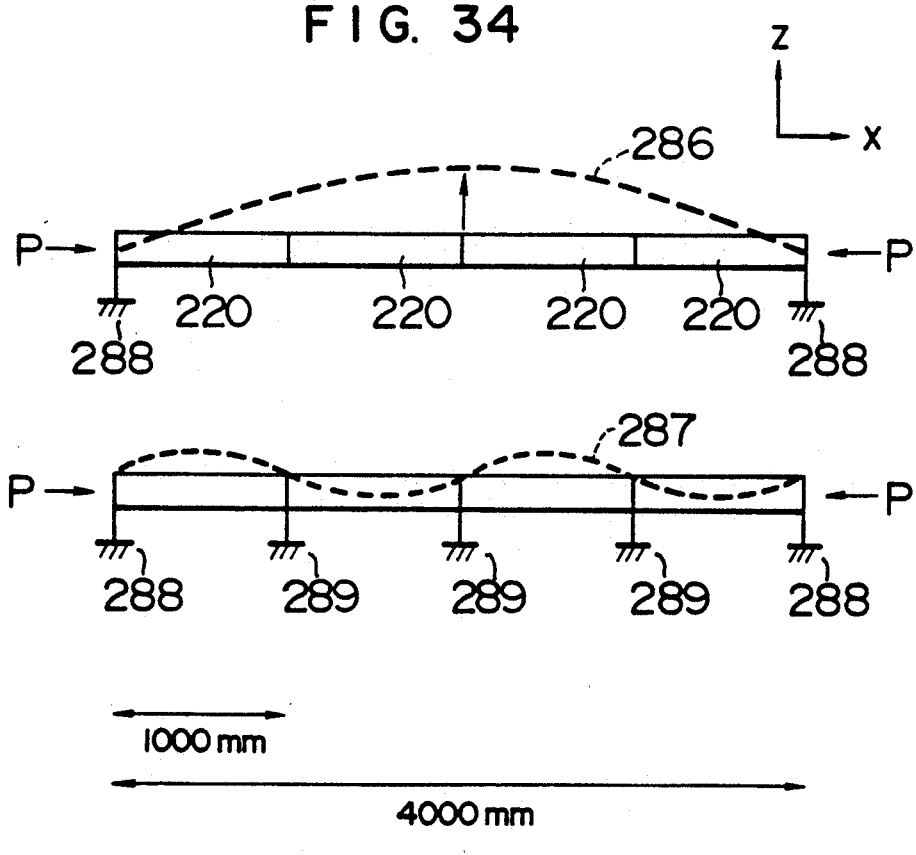
FIG. 34 is a view showing the effect of improvement of buckling resistant strength by z-direction absolute displacement-limiting means.

In FIG. 34, let's assume that total pressure P is applied in right and left directions. As will be appreciated from FIG. 34, in the absence of the displacement-limiting means 289, the screen is buckled as indicated by a dot-line waveform (buckling waveform) 286 whose half wave has a dimension of 4a. In the presence of the displacement-limiting means 289, the screen is buckled as indicated by a dot-line waveform 287 whose half wave has a dimension of a. The above-mentioned Euler's equation (1) is again described as follows as equation (14), and according to Euler's equation, in order to prevent the above buckling, the following must be satisfied:

$$\{P/(EI)\}^{\frac{1}{2}} \leq (\pi/l) \tag{14}$$

where the following is defined:
E = 300 kgG/(mm)$^2$ (Young's modulus)
I = (bt$^3$)/12 (second moment of area)
t = 12 mm
l = 4000 mm (with the means 289)
l = 1000 mm (without the means 289)
b = screen height
P = total pressure When P/(bt) is represented by P$_2$, the following is given:

$$P_2 \approx (\{Et^2\}/12) \cdot (\pi^2/l^2)$$

$$P_2 \approx 2.2 \ gG/(mm)^2 \text{ (without the means 289)}$$

$$P_2 \approx 36 \ gG/(mm)^2 \text{ (without the means 289)}$$

These are modified as follows:
$$P_2 \approx 1.2 \ G/(cm)^3 \times 1.8 \ m \text{ (without the means 289)}$$

$$P_2 \approx 1.2 \ G/(cm)^3 \times 30 \ m \text{ (with the means 289)}$$

Namely, with the z-direction displacement-limiting means 289 of the present invention, even the enormous screen of the four-row and four-column type is not subjected to buckling, but without the means 289, the screen is subjected to buckling. Namely, the z-direction displacement-limiting means also achieves the effect of enhancing the earthquake-resistant buckling strength by decreasing the buckling half-wave into the width of the unit screen. Although the description has been made with respect to the horizontal cross-section in FIG. 34, the same effect can be achieved with respect to the vertical cross-section.

The z-direction displacement-limiting means also prevents the overall screen from being macroscopically deformed (as indicated by the buckling waveform 286 in FIG. 34) according to the difference in expanding and contracting stress between the front and rear surfaces due to a change in temperature and humidity of the ambient environment, thereby enhancing the uniformity of the picture.

It has been described that in the 3rd to 9th embodiments (FIGS. 22 to 29), the urging deflection means for making the overscan light effective is applied to the screen side. By providing it on the screen side, there is achieved an advantage that this means can automatically follow the proportional expansion and contraction of the overall screen. Alternatively, the urging deflection means can be provided on the projection light source side, though the above advantage is not achieved. In the case of a CRT projector, the urging deflection means can be replaced by electron beam supplementary deflection means. In this case, more specifically, there is provided means for supplementally deflecting the overscan electron beam of each CRT locally toward the effective display screen.

An important portion of this construction is shown as a fourteenth embodiment of the invention in FIG. 35, and the operating waveforms thereof will be described with reference to FIG. 36.

In FIG. 35, reference numeral 90 denotes a CRT (cathode-ray tube), reference numeral 91 a supplementary vertical deflection coil, reference numeral 92 a current detection resistor, reference numeral 93 a negative feedback amplifier, reference numeral 94 a registration correction input signal of the known type, reference numeral 95 an adder, reference numeral 96 a urging deflection pulse generating circuit, reference numeral 97 a flyback pulse signal input, and reference numeral 98 a main deflection coil.

Except for the urging deflection pulse generating circuit 96, all the components in FIG. 35 are known techniques used in a CRT projection-type display, and therefore only the operation of the circuit 96 will now be described with reference to FIG. 36 showing the waveforms. In FIG. 36, reference numeral 97 denotes a vertical flyback pulse waveform, reference numeral 80 a vertical deflection current flowing into the main deflection coil 98, and reference numeral 81 an output of the urging deflection pulse generating circuit 96. These waveforms can be easily generated by a known digital processing technique employing a multi-vibrator or the like. A waveform 72 is formed by combining a deflection current 70 with a supplementary deflection current due to a pulse wave 71. In FIG. 36, each timing indicated by a dot line corresponds to the boundary between an effective light portion 74 and an overscan light portion 73 of the unit display screen.

It will be appreciated from FIG. 36 that the overscan light portion 73 is supplementally deflected locally toward the effective screen portion. Therefore, the light in the vicinity of the boundary band between the upper and lower unit Fresnel sheets is emphasized. Therefore, the boundary band can be made inconspicuous. Although the vertical deflection system has been described with respect to FIGS. 35 and 36, the same can be applied to the horizontal deflection system.

Figure 37:
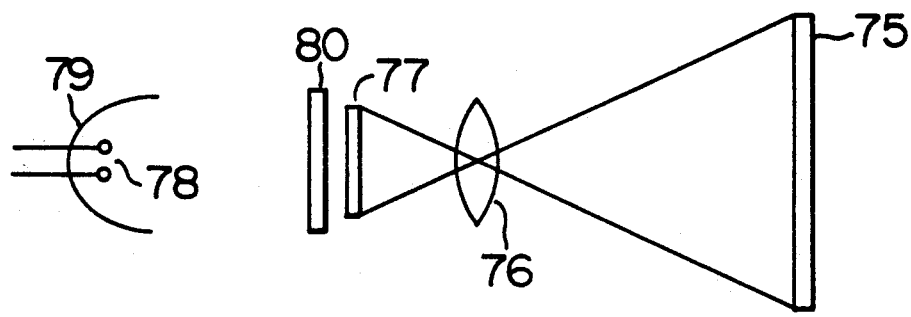
FIG. 37 is a view of a fifteen embodiment of the invention employing a liquid crystal projector.

FIG. 37 shows a fifteenth embodiment of the invention which enables the application of a liquid crystal projector. As is well known, in an ordinary liquid crystal projector, pixels are fixed to a liquid crystal panel. Therefore, electron beam deflection means can not be used, and as an alternative measure, there is used means for urging and deflecting overscan light inwardly which overscan light exists in the incident light on the liquid crystal panel.

In FIG. 37, reference numeral 75 denotes a screen, reference numeral 76 a projection lens, reference numeral 77 a liquid crystal panel, reference numeral 78 a lamp, reference numeral 79 a mirror, and reference numeral 80 urging deflection means. Light emitted from the lamp 78 is converted by the mirror into generally parallel rays, and is applied to the liquid crystal panel 77. The image light modulated by the panel 77 is applied to the screen 75 via the projection lens 76. An important portion of a specific example of the urging deflection means 80 is shown in FIG. 38.

Figure 38:
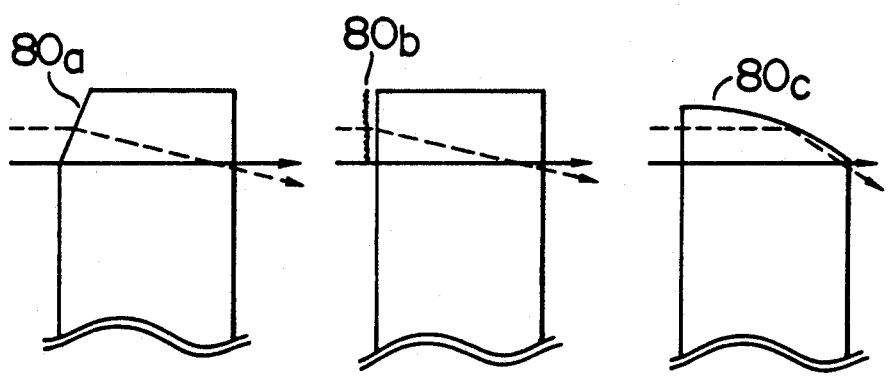
FIG. 38 shows side-elevational views of examples of urging deflection means in FIG. 37.

In FIG. 38, the light ray indicated by a solid line corresponds to the limit of the effective display screen, and the light ray indicated by a dot line is the overscan light. Reference numeral 80a denotes prism means, and reference numeral 80b denotes the various means already mentioned in FIG. 27, and reference numeral 80c denotes mirror means. The description of the fifteenth embodiment has now been finished.

Figure 39:
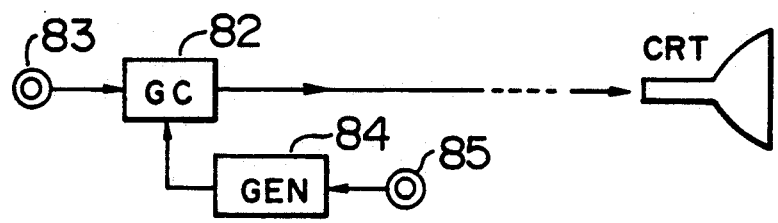
FIG. 39 is a circuit diagram showing an important portion of a sixteen embodiment of the invention.

FIG. 39 shows a sixteenth embodiment in which instead of the urging deflection means, boundary band image signal-emphasizing means is used. In FIG. 39, reference numeral 81 denotes a CRT or a liquid crystal panel, reference numeral 82 an amplifier of the known type capable of controlling the gain, reference numeral 83 an image signal input terminal, reference numeral 84 an image signal emphasizing pulse signal generating portion, and reference numeral 85 a horizontal/vertical flyback pulse signal input terminal. The emphasizing pulse signal generating portion 84 generates a pulse signal at the timing as indicated by the dot line in FIG. 36. At this timing, the image signal is emphasized by the amplifier 82, so that the discontinuity at the boundary band is made uniform. The description of the sixteenth embodiment has now been finished.

Figure 40:
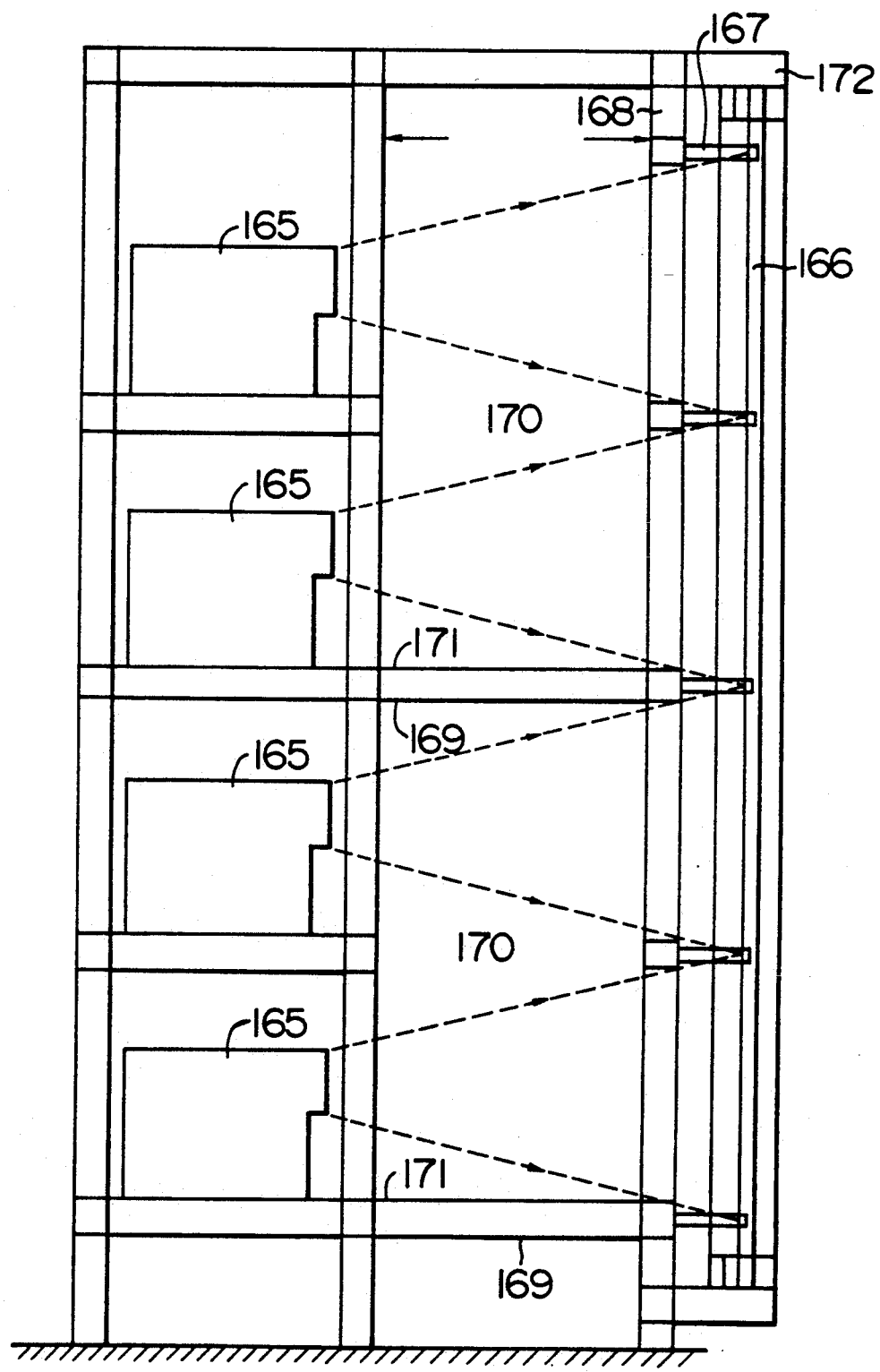
FIG. 40 is a side-elevational view of a seventeenth embodiment of the invention.
Figure 41:
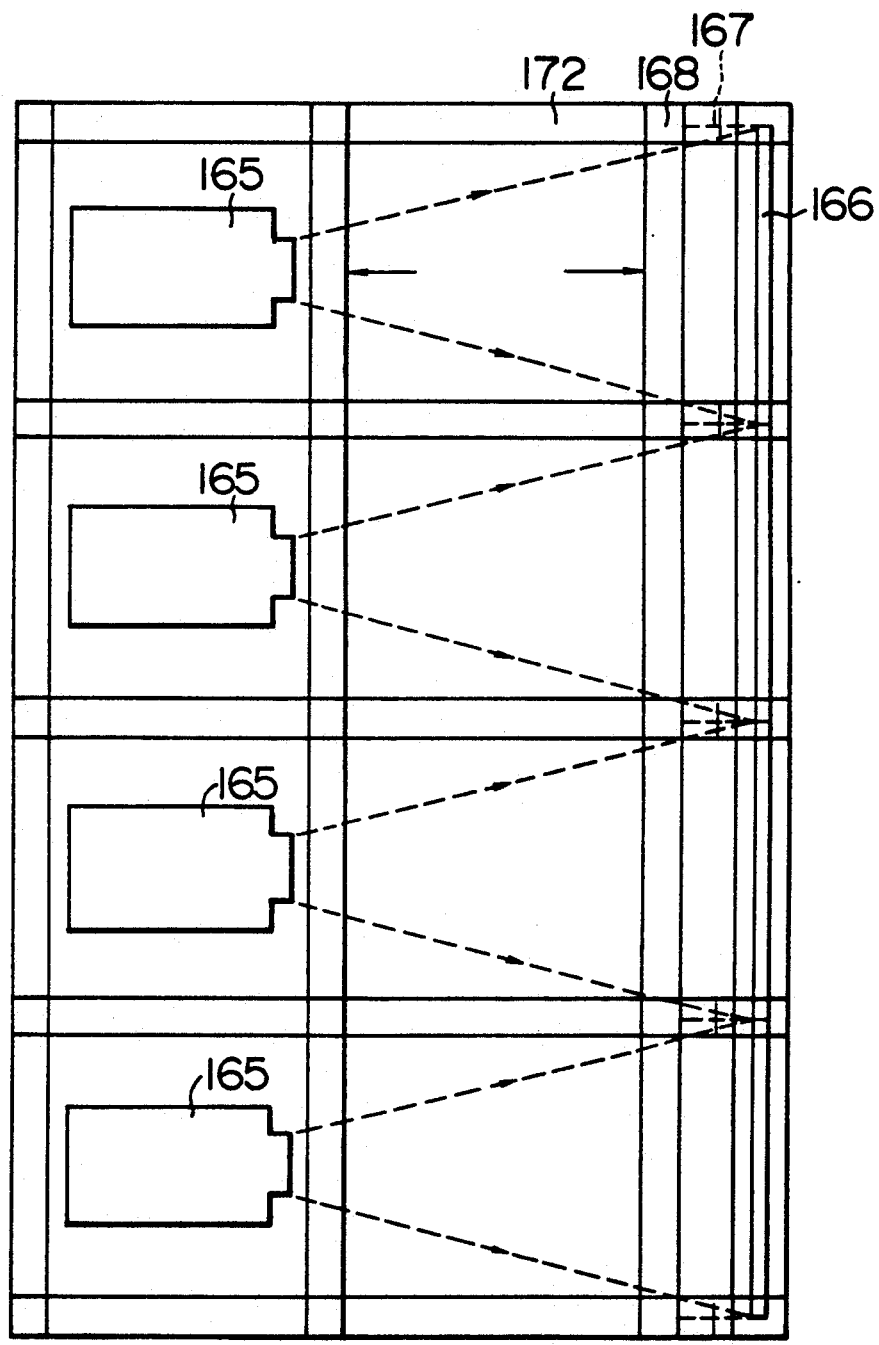
FIG. 41 is a top plan view of the seventeenth embodiment of 40.

FIGS. 40 and 41 show a seventeenth embodiment of the invention. These Figures show an example in which sixteen projectors arranged in four rows and four columns are used. FIG. 40 is a left side-elevational view, and FIG. 41 is a top plan view. The effective display screen size of the overall screen is about 4 m in width and about 3 m in height.

In FIGS. 40 and 41, reference numeral 165 denotes a projector, reference numeral 166 denotes a screen, reference numeral 167 forward-backward direction displacement-limiting means already described as at 247 in FIG. 18, and reference numeral 168 a pillar member to which the forward-backward direction displacement-limiting means is finally fixed. The pillar members 168 are connected to beams 169 by screws or by welding so as to increase the overall strength of a support base 169. The space between the group of projectors 165 and the pillar members 168 is used for the purpose of repair and maintenance. A floor 171 is supported on the beams 169, and the operator can walk on the floor 171 when effecting the maintenance or the like. Further, the pillar members 168 support ceiling beams 172, and support the weight of each screen column via the interface portion 244 already mentioned in FIG. 16.

Features of this embodiment are as follows:

(a) The pillar member is positioned at the effective projection light-absent region disposed rearwardly of the boundary band between the screen columns.

(b) The pillar member supports the load used for hanging each screen column.

(c) The pillar member 168 serves as fixing means for fixing the forward-backward direction displacement-limiting means.

(d) The pillar members 168 support part of the weight of the maintenance floor 171.

Figure 43:
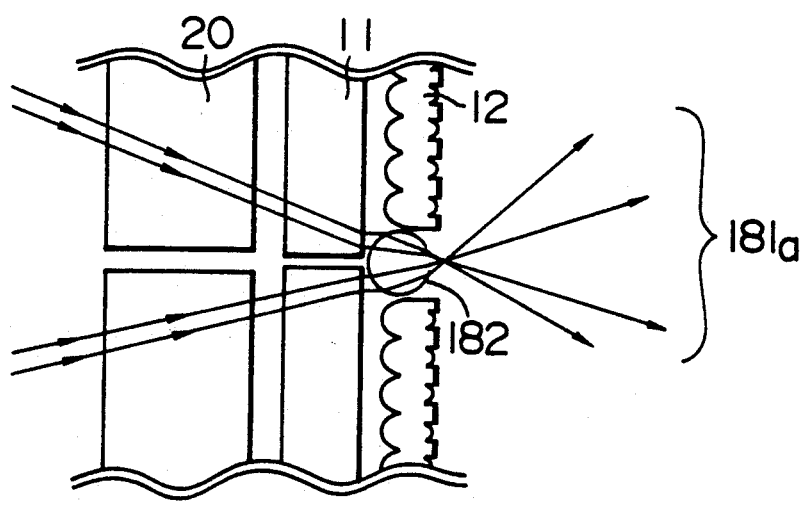
FIG. 43 is a view showing an eighteenth embodiment of the invention for eliminating the discontinuity of light.

One means for overcoming the light discontinuity at the default band along the opposed edges of the right and left unit screens is shown as an eighteenth embodiment in FIG. 43. FIG. 43 is a horizontal cross-sectional view of the default band.

This construction of FIG. 43 can effectively overcome the problem encountered when the width of the front sheet is smaller than the width of the Fresnel sheet.

Figure 20:
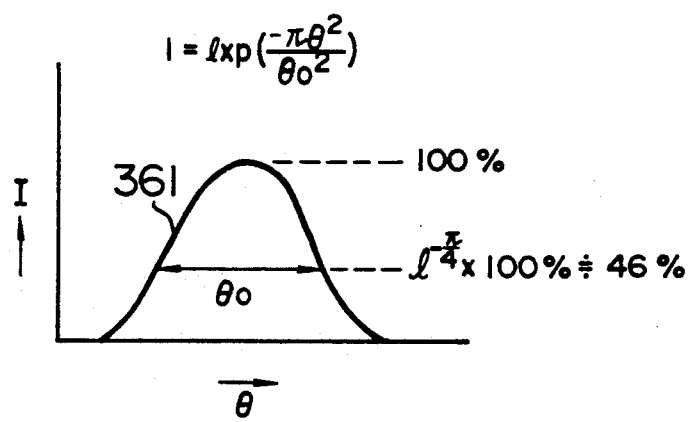
FIG. 20 is a characteristics diagram showing a profile on the retina.
Figure 42:
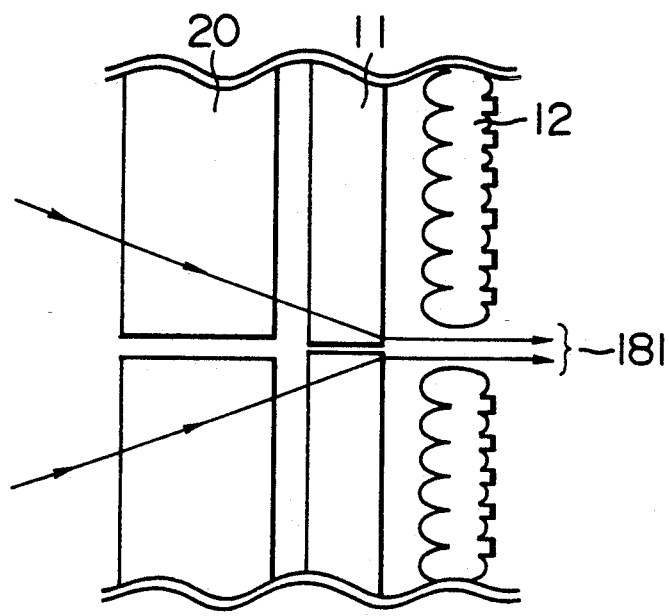
FIG. 42 is a plan view showing the discontinuity of light at a default band between opposed ends of right and left unit screens in the prior art.

This problem is shown in FIG. 42 which is a horizontal cross-sectional view. In FIG. 20, reference numeral 20 denotes a reinforcing sheet, reference numeral 11 a Fresnel sheet, reference numeral 12 a front sheet, and reference numeral 181 a limit projection light. Though the limit projection light is properly converted by the Fresnel sheet into parallel light rays, the limit projection light does not travel via the front sheet 12. Therefore, the effect of the front sheet 12 for dissipating the light in right and left directions can not be performed. As a result, the projection light 181 looks sparkling only from the front direction (i.e., in a direction normal to the screen), and can not be viewed from oblique directions. Namely, depending on the direction of the viewing, the discontinuity at the default band is viewed in an emphasized manner.

Next, the eighteenth embodiment will now be described with reference to FIG. 43. An important portion of this embodiment is a cylindrical lens 182. The cylindrical lens 182 is disposed at the default band between front sheets 12. The cylindrical lens functions to dissipate the limit projection light in the horizontal direction, as shown in FIG. 43. This dissipation effect is generally equivalent to the effect of the front sheet 12 for dissipating normal light (Details of the front sheet 12 are described in U.S. Pat. No. 4,536,056). Therefore, the discontinuity of the default band is reduced with this construction. The diameter of the cylindrical lens 182 is almost equal to the thickness of the front sheet 12, that is, about 1 mm. The cylindrical lens 182 can be made of a methacrylic resin, a styrene resin, a vinyl chloride resin, or the like. The cylindrical lens 182 may also be made of a mixture of such resin and diffuser particles (e.g. $SiO_2$).

Figure 44:
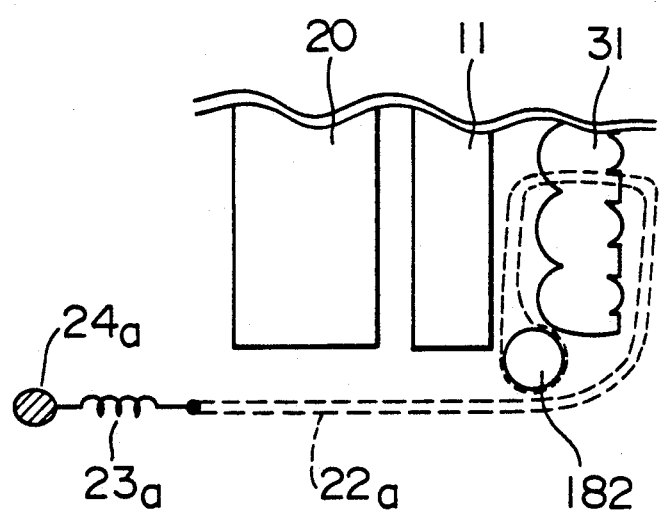
FIG. 44 is a view of a construction for supporting a cylindrical lens shown in FIG. 43.

FIG. 44 shows means for supporting the cylindrical lens 182. In FIG. 44, reference numeral 22a denotes a wire, reference numeral 23a a coil spring, and reference numeral 24a a support member. By the tension of the coil spring 23a, the cylindrical lens 182 is urged toward the gap between the Fresnel sheet 11 and the front sheet 12, and is held against these sheets. The wire 22a is passed through holes formed through the front sheet 12.

In the present invention, the sheet, such as Fresnel sheet, to be mounted between the reinforcing sheet and the front sheet can be fixedly supported without the use of screws. Therefore, the picture is not adversely affected by the shadows of such screws, and the information is not concealed by the shadows and therefore can be fully provided. Thus, the prevent invention provides the important effects indispensable to the information system.

In the present invention, the multi-screen of the n-row and m-column type can be accurately positioned in the horizontal and vertical directions, thus minimizing the influence on the picture. In addition, the appearance of the multi-screen is much like that of an integral screen.

In the present invention, even when the dimensions of the screen varies due to a change in temperature or humidity, the proper means is provided for dealing with the expansion and contraction of the screen so that the screen may not broken or be subjected to wrinkles. The relative position between the projectors and the screen is not changed by an external force.

In the present invention, since the pin is inserted in the hole formed in the side surface of each reinforcing sheet at the free space, any two adjacent reinforcing sheets are prevented from being displaced relative to each other in the forward and backward directions. Therefore, there can be provided the enormous multi-screen having a uniform appearance.

In the present invention, by the z-direction (i.e., direction perpendicular to the plane of the screen) displacement-limiting means, the displacement of the screen surface in the forward and backward directions can be limited, thereby ensuring the earthquake-resistant buckling strength. Further, the overall screen surface will not be warped even when the temperature and humidity of the ambient environment changes. Therefore, the uniformity of the reproduction image can be enhanced.

In the present invention, at least the weight of the group of Fresnel sheets is supported by the shelf means provided at the lower end portion of the screen, and the shelf means cooperates with the spring means to prevent the Fresnel sheets from dropping, and also the gap between the unit Fresnel sheets is minimized, thus minimizing the width of the default band of the picture.

In the present invention, by the urging deflection means for converting the overscan light into the effective light, the uniformity of the reproduction image can be enhanced.

Further, the present invention can provide the multi-screen which is excellent in maintenance.

What is claimed is:

1. A multi-screen projector comprising:
   n x m unit projectors arranged horizontally in m columns and vertically in n rows like a matrix, where n and m are positive integers either of which is two or more;
   transmissive screen means comprising at least three-layer sheet means connected together in m columns, each column of said three-layer sheet means comprising (i) at least n rows of unit Fresnel sheets, (ii) a front sheet comprising a single front sheet element or n front sheet elements covering the n row, said front sheet having lenticular stripes for diffusing light horizontally, and (iii) a transparent reinforcing sheet on which each row of unit Fresnel sheets and said front sheet are placed in a laminated manner;
   light shielding means mounted on a light incident side of said reinforcing sheet; and
   wires and springs connecting said light shielding means to at least right and left edges of said front sheet to produce tension so as to urge said front sheet toward said reinforcing sheet.

2. A multi-screen projector according to claim 1, in which a support piece is mounted on the lower end portion of said reinforcing sheet, the n rows of unit Fresnel sheets being stacked on said support piece, and there being provided wires and springs connecting said light shielding means to at least right and left edges of each said unit Fresnel sheet to produce tension so as to urge said unit Fresnel sheet toward said reinforcing sheet.

3. A multi-screen projector according to claim 2, in which said wires and springs connected to said Fresnel sheet are arranged in such a manner as to produce the tension to lift said unit Fresnel sheet.

4. A multi-screen projector according to claim 1 or claim 2, in which a refraction sheet for refracting the light at least vertically is provided between said front sheet and said Fresnel sheet.

5. A multi-screen projector according to claim 4, in which said refraction sheets are stacked in n rows on said support piece, there being provided wires and springs connecting said light shielding means to at least right and left edges of said refraction sheet to produce tension so as to urge said refraction sheet toward said reinforcing sheet.

6. A multi-screen projector according to claim 5, in which said wires and springs connected to said refraction sheet are arranged in such a manner as to produce the tension to lift said refraction sheet.

7. A multi-screen projector according to claim 1, in which the multi-screen is hung on a support base, there being provided a mechanism for moving m columns of said multi-screens upward and downward.

8. A multi-screen projector according to claim 7, in which said screen means is horizontally movable in response to the thermal expansion and contraction of said reinforcing sheet of said multi-screen.

9. A multi-screen projector according to claim 7 or claim 8, in which fixed points are provided respectively at predetermined portions of said screen means so as to maintain the relative position of said screen means and said projector means.

10. In a multi-screen projector comprising a plurality of unit projectors, and an overall screen composed of a plurality of unit screen portions corresponding respectively to said plurality of unit screens; said overall screen being constituted by a plurality of vertically-elongated screens arranged side by side; the improvement wherein relative displacement prevention means for preventing the right and left opposed edges of any two adjacent elongated screens from being displaced from each other in a direction perpendicular to the plane of said elongated screens is provided at an effective projection light-absent region where the projection light projected from said projector onto said screen is not hindered.

11. A multi-screen projector according to claim 10, in which each of said elongated screens has a reinforcing sheet, a hole being formed in a side wall of said reinforcing sheet, and said relative displacement prevention means comprising a pin inserted in said holes in said reinforcing sheets of any two adjacent elongated screens.

12. In a multi-screen projector comprising a plurality of unit projectors, and an overall screen composed of a plurality of unit screen portions corresponding respectively to said plurality of unit screens; said overall screen being constituted by a plurality of vertically-elongated screens arranged side by side; the improvement wherein forward-backward direction absolute displacement-limiting means for limiting the absolute displacement of the elongated screens in a direction perpendicular to the plane of said elongated screens is provided at the right and left edges of said elongated screens and is disposed at an effective projection light-absent region where the projection light projected from said projector onto said screen is not hindered; and said absolute displacement-limiting means comprises a buckling load-resistant plate, and at least two pins one of which connects one end of said plate to the end of said elongated screen while the other pin connects the other end of said plate to an absolute fixing position in such a manner that said elongated screen is free to move at least upward and downward.

13. A multi-screen projector according to claim 12, in which each of said elongated screens has a reinforcing sheet, a hole being formed in a side wall of said reinforcing sheet, and one of said two pins of said absolute displacement-limiting means being inserted in said holes in said reinforcing sheets of any two adjacent elongated screens.

14. A multi-screen projector according to claim 10 or claim 12, in which each of said elongated screens comprises a vertically-elongated reinforcing sheet, a vertically-elongated front sheet, and a vertically-elongated Fresnel sheet sandwiched between said reinforcing sheet and said front sheet, shelf means being fixedly mounted on said reinforcing sheet at a lower end portion of said elongated screen, said front sheet being subjected to a component force produced by wires and springs extended between said front sheet and predetermined absolute fixing positions, so that said front sheet is urged toward and bound to said reinforcing sheet via said Fresnel sheet, and the weight of said Fresnel sheet being supported by said shelf means fixed to said reinforcing sheet.

15. In a multi-screen projector comprising a plurality of unit projectors, and an overall screen composed of a plurality of unit screen portions corresponding respectively to said plurality of unit screens; each of said unit screen portions comprising a unit reinforcing sheet, a unit front sheet, and a unit Fresnel sheet sandwiched between said unit reinforcing sheet and said unit front sheet; the improvement wherein there is provided urging deflection means for directing overscan light toward an effective field of vision to convert said overscan light into effective light; the light, projected onto the peripheral portion of said unit Fresnel sheet, constituting said overscan light since it is out of the effective field of vision.

16. A multi-screen projector according to claim 15, in which said urging deflection means comprises one of prism means, lenticular stripe means and light diffusing means provided on the light-incident side of said unit Fresnel sheet at the peripheral portion thereof.

17. A multi-screen projector according to claim 15, in which said urging deflection means comprises prism means provided on the light-outgoing side of said Fresnel sheet at the peripheral portion thereof.

18. A multi-screen projector according to claim 15, in which said urging deflection means comprises one of prism means, lenticular stripe means and light diffusing means provided on the light-incident side of said unit reinforcing sheet at the peripheral portion thereof.

19. A multi-screen projector according to claim 15, in which said urging deflection means comprises inclined mirror means provided on a side surface of said unit reinforcing sheet.

20. A multi-screen projector according to claim 15, in which said unit projector comprises a unit CRT projector, said urging deflection means comprising supplementary deflection means for locally deflecting overscan electron beams of said CRT toward an effective display screen.

21. A multi-screen projector according to claim 15, in which said unit projector comprises a unit liquid crystal projector, said urging deflection means comprising end light emphasizing means provided in the vicinity of a liquid crystal panel of said liquid crystal projector.

22. A multi-screen projector according to claim 15, in which said urging deflection means comprises means for emphasizing an image signal at the end of the effective screen.

23. In a multi-screen projector comprising a plurality of unit projectors, and an overall screen composed of a plurality of unit screen portions corresponding respectively to said plurality of unit screens; said overall screen being constituted by a plurality of vertically-elongated screens arranged side by side; the improvement wherein forward-backward direction absolute displacement-limiting means for limiting the absolute displacement of said elongated screens in a direction perpendicular to the plane of said elongated screens is provided at the right and left edges of said elongated screens and is disposed at an effective projection light-absent region where the projection light projected from said projector onto said screen is not hindered; said absolute displacement-limiting means comprises a buckling load-resistant plate, and at least two pins one of which connects one end of said plate to the end of said elongated screen while the other pin connects the other end of said plate to a pillar member fixed near the screen, in such a manner that said elongated screens are free to move at least upward and downward; a space formed between a support base supporting said unit projectors and said pillar members is used as a maintenance space; part of a floor portion of said maintenance space is supported by said pillar members; the weight of said elongated screens are supported by said pillar members; and said pillar members and said floor portion are disposed at the effective projection light-absent region where the projection light projected from said projector onto said screen is not hindered.

24. A multi-screen projector according to claim 12, in which said limiting means is fixed at one end thereof to pillar means, a maintenance space being provided between said pillar means and a support base supporting said unit projectors, part of the weight of floor means of said space being supported by said pillar means, the weight of each row of said elongated screen being supported by said pillar means, and said pillar means and said floor means being disposed at the effective projection light-absent region.

25. In a multi-screen projector comprising at least a plurality of unit Fresnel sheets arranged like a matrix, the improvement wherein a cylindrical lens is provided at opposed edges of any two adjacent ones of said unit Fresnel sheets at light-outgoing sides of said unit Fresnel sheets.

* * * * *